(12) United States Patent
Miller et al.

(10) Patent No.: US 6,697,727 B2
(45) Date of Patent: Feb. 24, 2004

(54) METHOD AND SYSTEM FOR CONTROLLING A DRIVETRAIN RETARDER

(75) Inventors: Stanton E. Miller, Fort Wayne, IN (US); Chris L. Wilson, Fort Wayne, IN (US); Lawrence D. Hasfjord, Fort Wayne, IN (US); Erik C. Wilson, Fort Wayne, IN (US); Brian P. Marshall, Fort Wayne, IN (US); David V. Rodgers, Bloomingdale, IL (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 69 days.

(21) Appl. No.: 10/086,083

(22) Filed: Feb. 27, 2002

(65) Prior Publication Data

US 2002/0152014 A1 Oct. 17, 2002

Related U.S. Application Data

(60) Provisional application No. 60/273,270, filed on Mar. 2, 2001.

(51) Int. Cl.$^7$ ............................................. B60K 41/20
(52) U.S. Cl. ..................... 701/70; 701/71; 701/48; 701/82; 192/215; 192/216; 192/218; 477/107; 477/118
(58) Field of Search ........................ 701/70, 71, 48, 701/82; 192/215, 216, 218; 477/107, 118

(56) References Cited

U.S. PATENT DOCUMENTS

| | | | |
|---|---|---|---|
| 4,061,215 A | | 12/1977 | Ishikawa |
| 4,272,131 A | * | 6/1981 | Termont .................... 303/3 |
| 4,314,487 A | * | 2/1982 | Ahlen ....................... 477/54 |
| 4,961,145 A | | 10/1990 | Gernot |
| 5,088,582 A | | 2/1992 | Saitou et al. |
| 5,121,723 A | * | 6/1992 | Stepper et al. .............. 123/322 |
| 5,130,928 A | * | 7/1992 | Petersen ..................... 701/78 |
| 5,287,773 A | | 2/1994 | Nakawaki et al. |
| 5,393,276 A | | 2/1995 | White et al. |
| 5,693,927 A | | 12/1997 | Wilson |
| 5,794,735 A | * | 8/1998 | Sigl .......................... 180/170 |
| 5,816,665 A | * | 10/1998 | Burnett et al. ................ 303/3 |
| 5,855,534 A | * | 1/1999 | Bates ........................ 477/120 |
| 6,267,705 B1 | * | 7/2001 | Rose et al. ................... 477/92 |

FOREIGN PATENT DOCUMENTS

| | | |
|---|---|---|
| DE | 44 20 116 A1 | 12/1995 |
| DE | 198 22 859 A1 | 7/1999 |
| DE | 198 43 580 A1 | 3/2000 |
| EP | 0 974 505 A1 | 1/2000 |

* cited by examiner

Primary Examiner—Michael J. Zanelli
Assistant Examiner—Eric M Gibson
(74) Attorney, Agent, or Firm—Jeffrey P. Calfa; Dennis Kelly Sullivan; Susan L. Lukasik

(57) ABSTRACT

A method of operating a retarder control system for a drivetrain retarder such as an engine compression brake of a heavy-duty truck vehicle is disclosed. The method of operation includes three novel subsets each of which controls the operational state and the resistance level at which the drivetrain retarder is operated dependent at least partially upon one or more factors including speeds of one or more drivetrain components, vehicle speed, rotational speed of one or more undriven wheels, position of a brake control member, elapsed time of activation of a brake control member and/or elapsed time from a change in a selected resistance level at which the retarder control system is commanded to effect operation of the drivetrain retarder.

31 Claims, 17 Drawing Sheets

METHOD AND SYSTEM FOR CONTROLLING A DRIVETRAIN RETARDER

This non-provisional patent application claims priority under Provisional Patent Application Serial No. 60/273,270, filed Mar. 2, 2001.

BACKGROUND OF THE INVENTION

This invention relates to the control of drivetrain retarders of vehicles. Drivetrain retarders are devices that can be operated to absorb power from a drivetrain of a vehicle in motion in order to reduce the vehicle's speed. There are a number of types of drivetrain retarders that are well known. Engine compression brakes and exhaust brakes are well known types of drivetrain retarders. In vehicles driven by electric motors it is well known to utilize the vehicle's electric drive motor as a drivetrain retarder by causing it to operate as an electrical generator. Drivetrain retarders in the form of hydraulic pumps and other similar devices that can be coupled to the vehicle's drivetrain in order to absorb power are also well known.

Control of such drivetrain retarders includes controlling whether the drivetrain retarder's operational state is on or off and controlling the resistance level of the drivetrain retarder. When a vehicle is in motion and such control systems of the vehicle cause a drivetrain retarder of the vehicle to be in an on operational state the drivetrain retarder absorbs power from the vehicles drivetrain and, thus, retards the motion of the vehicle. When such control systems of a vehicle cause a drivetrain retarder to be in an off operational state the drivetrain retarder absorbs substantially no power from the drivetrain of the vehicle and, thus, does not retard motion of the vehicle. Many drivetrain retarders are constructed so that they can be selectively operated at one of a plurality of resistance levels. All other conditions being the same, such a drivetrain retarder absorbs different amounts of power when it is operated at each of its different resistance levels. For example, many engine compression brakes activate compression braking of a different number of engine cylinders when the engine compression brake is operated at each different one of its resistance levels.

Known control systems of drivetrain retarders accommodate only relatively simplistic methods for controlling the operational state and the resistance levels of such drivetrain retarders. Many retarder control systems control the operational state and the resistance level of a drivetrain retarder dependent only upon the operational states of a retarder state selector and a retarder resistance selector which are manually controlled by an operator of the vehicle. For example, many retarder control systems for engine compression brakes of vehicles control the operational state and the resistance level of the engine compression brake based entirely upon the operational state of an on/off switch and a resistance level switch that are both manually controlled by a vehicle operator. Examples of retarder control systems that control the operational state of a drivetrain retarder based upon factors other than the operational state of a retarder state selector are known. It is known to construct a retarder control system in such a manner that, when an Anti-Lock Braking system of the vehicle is actived, the operational state of the drivetrain retarder is caused to become off regardless of the operational state of the retarder state selector of the retarder control system. It is not known to construct retarder control systems that control the resistance level of a drivetrain retarder based upon factors other than the operational state of a retarder resistance selector. Therefore, when a drivetrain retarder is caused by its retarder control system to be in an on operational state, the drivetrain retarder will operate at whatever resistance level is effected by the operational state of the retarder resistance selector of the retarder control system. In many cases operation of the drivetrain retarder at the resistance level effected by the operational state of the retarder resistance selector is not ideal.

SUMMARY OF INVENTION

As a result, an object of the present invention is to provide a method of operation of a retarder control system that controls the resistance level at which a drivetrain retarder is operated based upon factors other than the operational state of a retarder resistance selector. A further object of the invention is to provide a retarder control system that can be operated according to a method in which the resistance level at which a drivetrain retarder is operated is controlled based upon factors other than the operational state of a retarder resistance level selector.

The present invention is a method of operation of a retarder control system that controls the resistance level at which a drivetrain retarder is operated based upon one or more of a number of factors other than the operational state of a retarder resistance selector. The resistance level that the drivetrain retarder is caused to operate at by the retarder control system may depend upon one or more factors such as rotational speeds of various components of the drivetrain of the vehicle, vehicle speed, rotational speeds of undriven wheels of the vehicle, brake pedal position, elapsed time after brake pedal actuation, and elapsed time after initiation of operation of the drivetrain retarder in the on operational state. The retarder control system of the present invention includes any devices such as sensors, timers, switches, and computing devices necessary to enable it to control the resistance level of the drivetrain retarder according to one or more of the above mentioned factors. The present invention also includes a vehicle that has a drivetrain retarder and a retarder control system that operate according to the method of the present invention. The present invention also includes a computer program for causing the retarder control system of the present invention to operate according to the method of the present invention.

DRAWINGS

Other objects and advantages of the invention will become more apparent upon perusal of the detailed description thereof and upon inspection of the drawings in which.

DETAILS OF INVENTION

Figure 1:
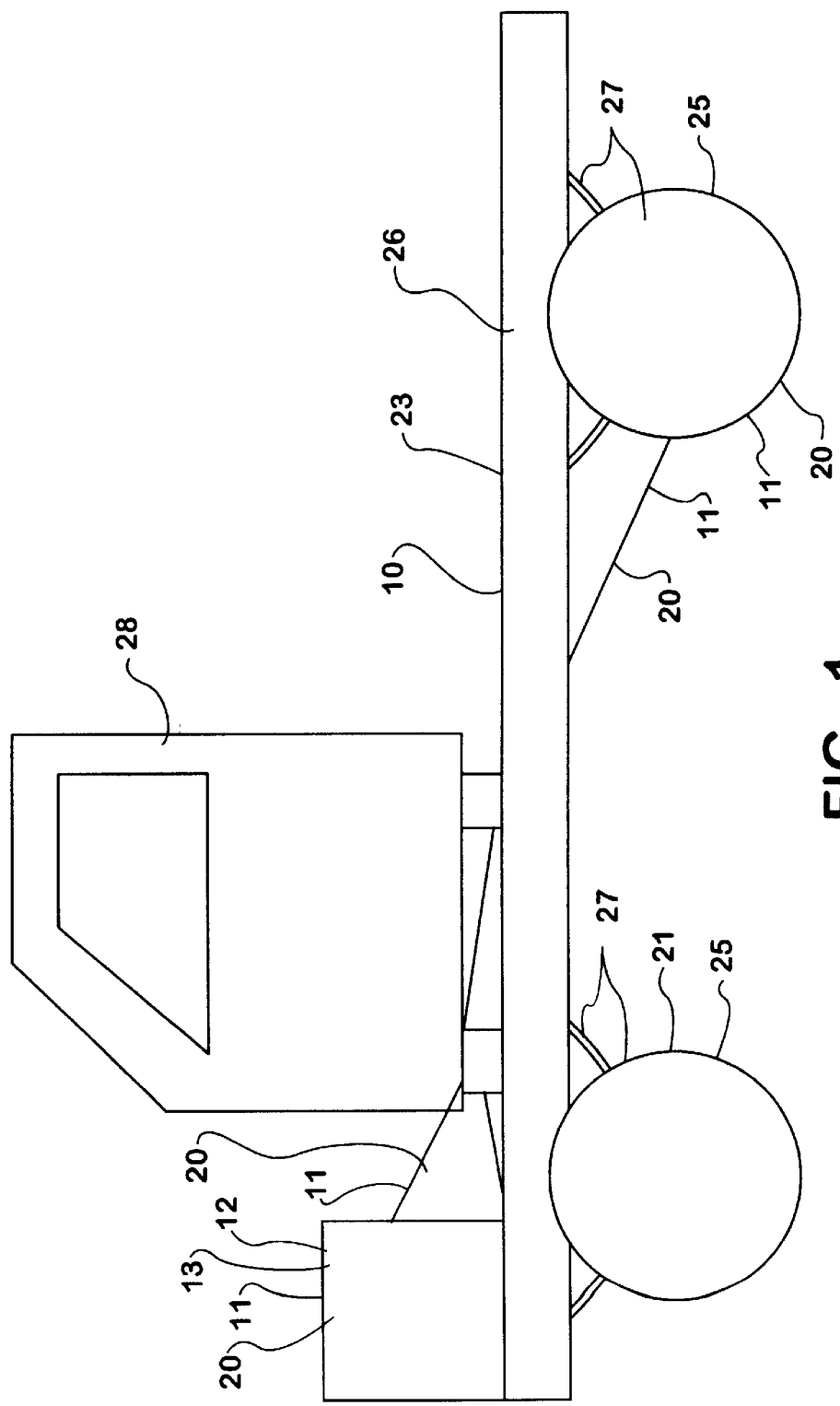
FIG. 1 is an elevational view of a vehicle with a drivetrain retarder.

The present invention is a method of operating a retarder control system 17 that controls the operations of a drivetrain retarder 12 of a vehicle 10. The present invention may also include a computer program for causing a retarder control system 17 to operate according to the method of the present invention. The present invention may further include a retarder control system 17 that is constructed in a manner such that it can be operated according to the method of the present invention and a vehicle 10 that includes a retarder control system 17 operated according to the method of the present invention. The method of the present invention is for operating a retarder control system 17 that controls a drivetrain retarder 12 that has operational states of on and off and that can be selectively operated at any of a plurality of unique resistance levels. When a retarder control system 17 operating according to the method of the present invention causes the operational state of the drivetrain retarder 12 to be on, the retarder control system 17 also controls the resistance level at which the drivetrain retarder 12 is operated. When a retarder control system 17 operating according to the method of the present invention controls the resistance level at which a drivetrain retarder 12 operates, the retarder control system 17 causes the drivetrain retarder 12 to operate at one of the plurality of resistance levels at which the drivetrain retarder 12 can be operated. For purposes of this disclosure a currently preferred resistance level is, by definition, the particular resistance level that the retarder control system 17 causes the drivetrain retarder 12 to operate at for a given set of circumstances. The status or value of one or more factors that influence the operation of the retarder control system 17 effect which one of the plurality of possible resistance levels will be the currently preferred resistance level for a given set of circumstances. According to the method of the present invention the currently preferred resistance level is dependent at least partially upon one or more factors selected from a group consisting of speeds of one or more drivetrain components, vehicle speed, rotational speed of one or more undriven wheels, position of a brake control member, elapsed time of actuation of a brake control member, and elapsed time that the drivetrain retarder has had an operational state of on.

A retarder control system 17 according to the present invention may have many different designs well known to and/or easily imaginable by one of ordinary skill in the art. A retarder control system according to the present invention may receive inputs from any of a number of different sources. According to the preferred embodiment of the present invention the retarder control system 17 comprises a retarder state selector 18 and a retarder resistance selector 19 the inclusion of both of which in conventional retarder control systems 17 being well known. The retarder state selector 18 of the retarder control system 17 of the preferred embodiment is operable to allow an operator of a vehicle 10 that comprises the retarder control system 17 to command the retarder control system 17 to effect certain operational states of the drivetrain retarder 12. The operational states that the retarder state selector 18 can be used to command the retarder control system to effect, include but are not limited to the on operational state and the off operational state. As will be discussed in greater detail below a retarder control system 17 operating according to the methods of the present invention may override the command received from the operator of the vehicle 10 through the retarder state selector to effect a particular operational state of the drivetrain retarder 12. The retarder resistance selector 19 can be used by an operator of the vehicle 10 to communicate to the retarder control system 17 a selected resistance level at which the operator of the vehicle 10 wishes the retarder control system 17 to operate the drivetrain retarder 12 unless the method of operation of the present invention dictates that the drivetrain retarder 12 be operated at a resistance level other than one set by the retarder resistance selector 19.

The present invention includes a plurality of different novel subsets of a method of operation of a retarder control system 17. Each of the different novel subsets of a method of operation of a retarder control system 17 of the present invention correspond to operation of the retarder control system 17 in different circumstances, A method of operation according to the present invention of a retarder control system 17 may comprise any combination of steps that includes one or more of the different novel subsets described in further detail hereinafter.

One novel subset of a method of operation of the present invention of a retarder control system 17 is a progressive transition method. During the operation of a retarder control system 17 changing circumstances often cause the currently preferred resistance level that a drivetrain retarder 12 is operated at to transition from a starting resistance level to an ending resistance level during a transition period. Many known methods of operating a retarder control system 17 cause the resistance level that a drivetrain retarder 12 is operated at to transition during a virtually instantaneous transition period between a starting resistance level and an ending resistance level between which there is a large difference in magnitude. Such an instantaneous and large change in the resistance level that a drivetrain retarder 12 is operated at causes a vehicle 10 to undergo undesirable jerk. A retarder control system 17 operating according to the progressive transition method of the present invention causes a drivetrain retarder 12 to operate at one or more intermediate resistance levels during a transition between a starting resistance level and an ending resistance level. When the operation of a drivetrain retarder 12 is transitioned from a starting resistance level to an ending resistance level according to the progressive transition method of the present invention the vehicle 10 is subjected to substantially less jerk than would occur as a result of traditional methods of operation of a retarder control system 17.

A method of operating a retarder control system according to the present invention need not utilize the progressive transition method for every set of circumstances in which the operation of a drivetrain retarder 12 is transitioned from a starting resistance level to an ending resistance level. Different embodiments of methods of operation of a retarder control system 17 in accordance with the present invention may employ the progressive transition method of the present invention for different sets of circumstances. For example a method according to the present invention of operating a retarder control system 17 may employ the progressive transition method of the present invention only when operation of a drivetrain retarder 12 is transitioned from a starting resistance level that is relatively higher than the ending resistance level. Alternatively, a method according to the present invention of operating a retarder control system 17 may employ the progressive transition method only when operation of the drivetrain retarder 12 is transitioned from a starting resistance level that is relatively lower than an ending resistance level. In the preferred embodiment the progressive transition method is employed any time the resistance level at which the drivetrain retarder 12 of the vehicle is transitioned from a starting resistance level between which and an ending resistance level there are one or more intermediate resistance levels. In other words, according to the preferred embodiment the retarder control system 17 never skips resistance levels when increasing or decreasing the resistance level at which the drivetrain retarder 12 is operated.

Figure 3:
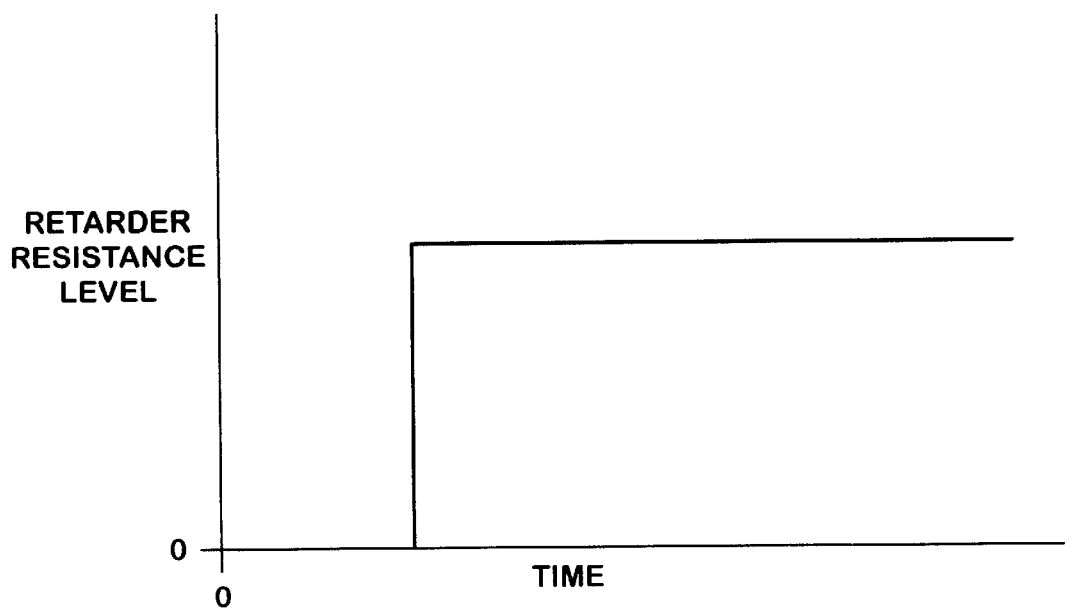
FIG. 3 is graphical representation of the retarder resistance level versus time at activation for operation of a retarder control system according to prior art methods.
Figure 4:
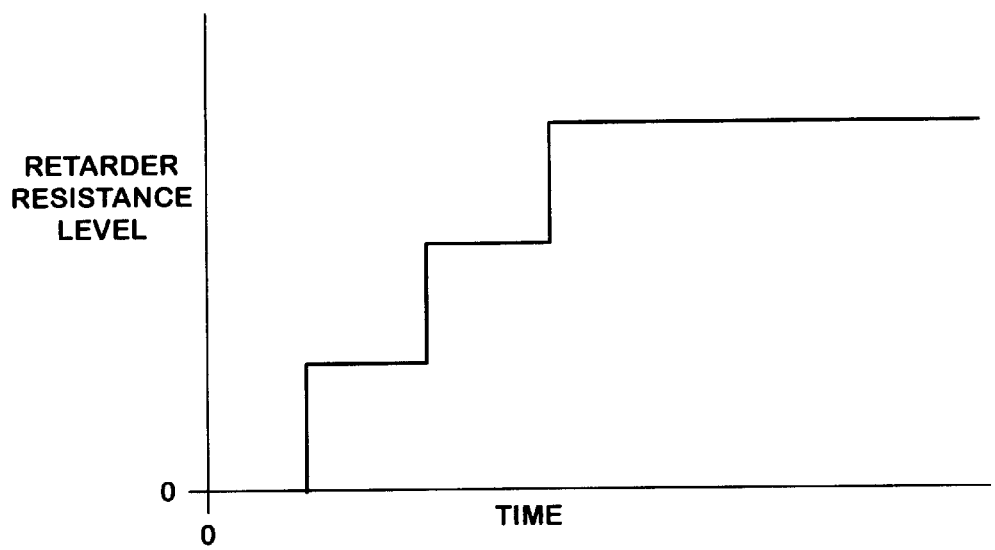
FIG. 4 is a graphical representation of a retarder resistance level at activation according to a first embodiment of the progressive transition method of the present invention.
Figure 5:
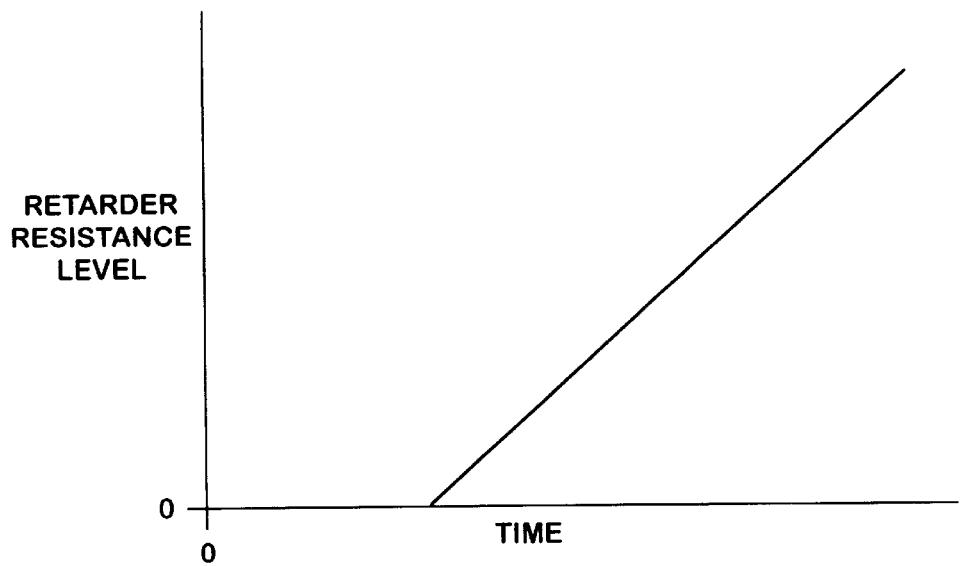
FIG. 5 is a graphical representation of a retarder resistance level at activation according to a second embodiment of the progressive transition method of the present invention.
Figure 6:
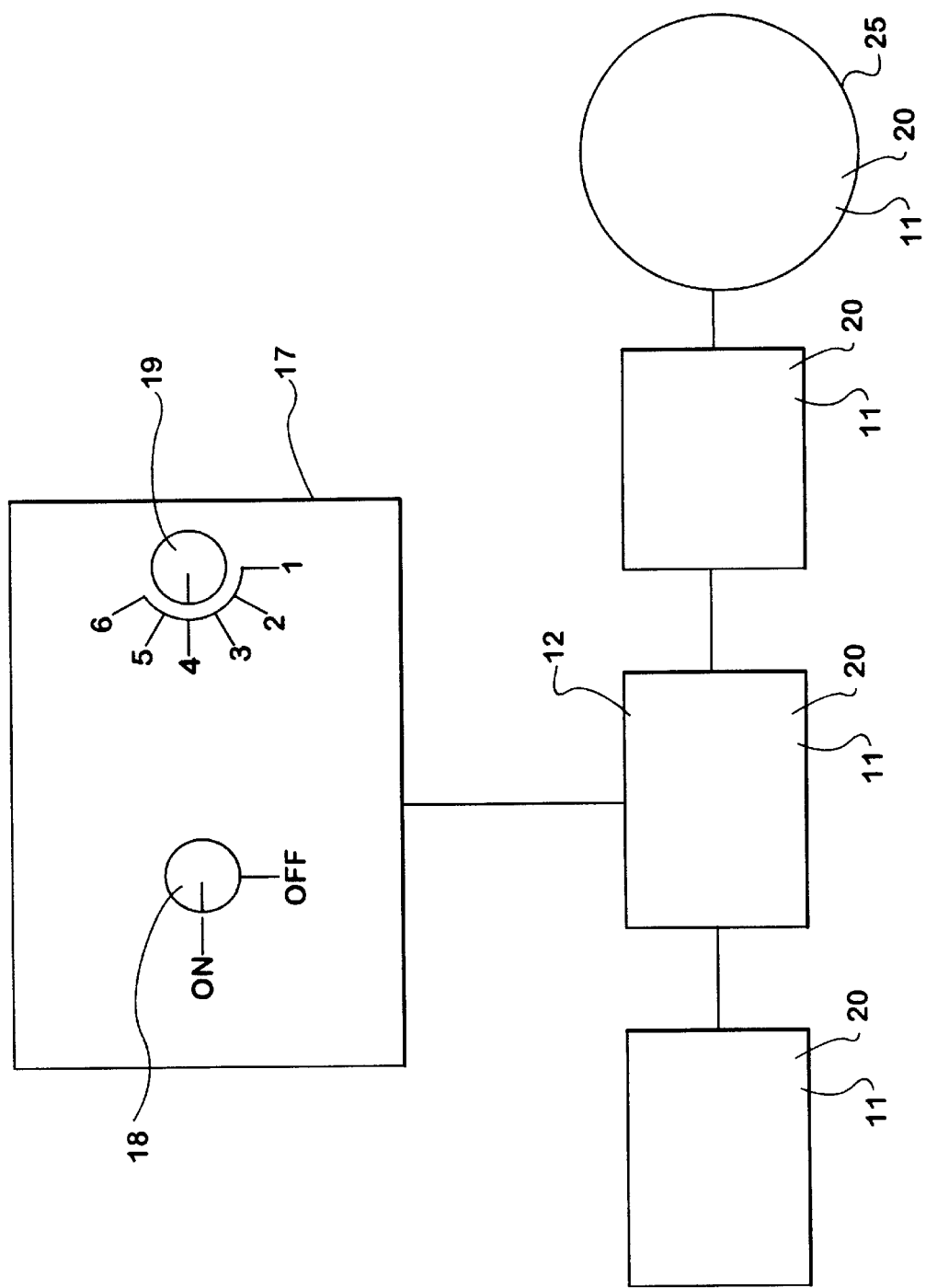
FIG. 6 is a schematic representation of a drivetrain of a vehicle that includes a drivetrain retarder and a retarder control system.
Figure 7:
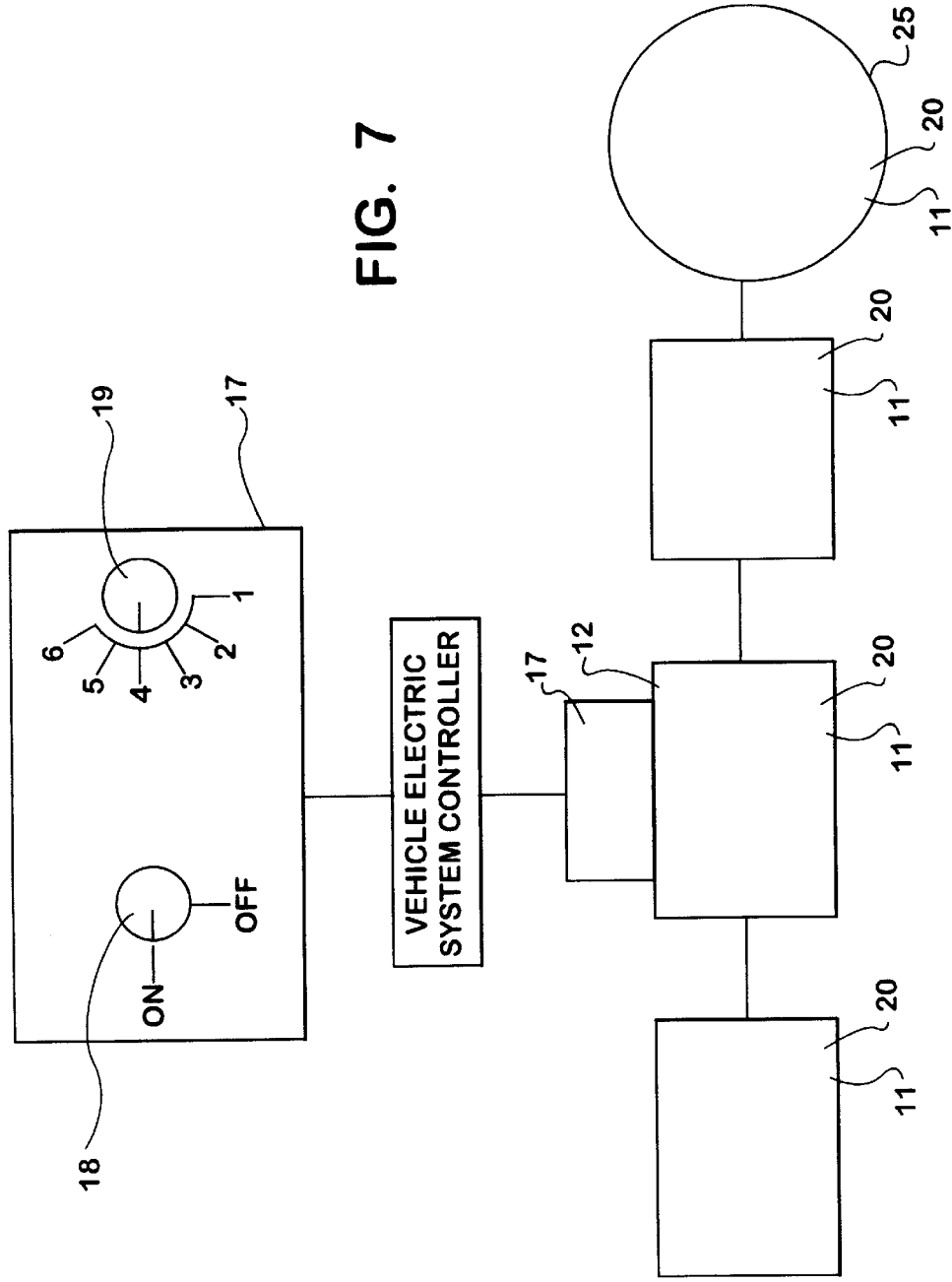
FIG. 7 is a schematic representation of a drivetrain of a vehicle that includes a drivetrain retarder and a retarder control system that is particularly well suited to enable operation of the retarder control system according to the progressive transition method of the present invention.
Figure 8:
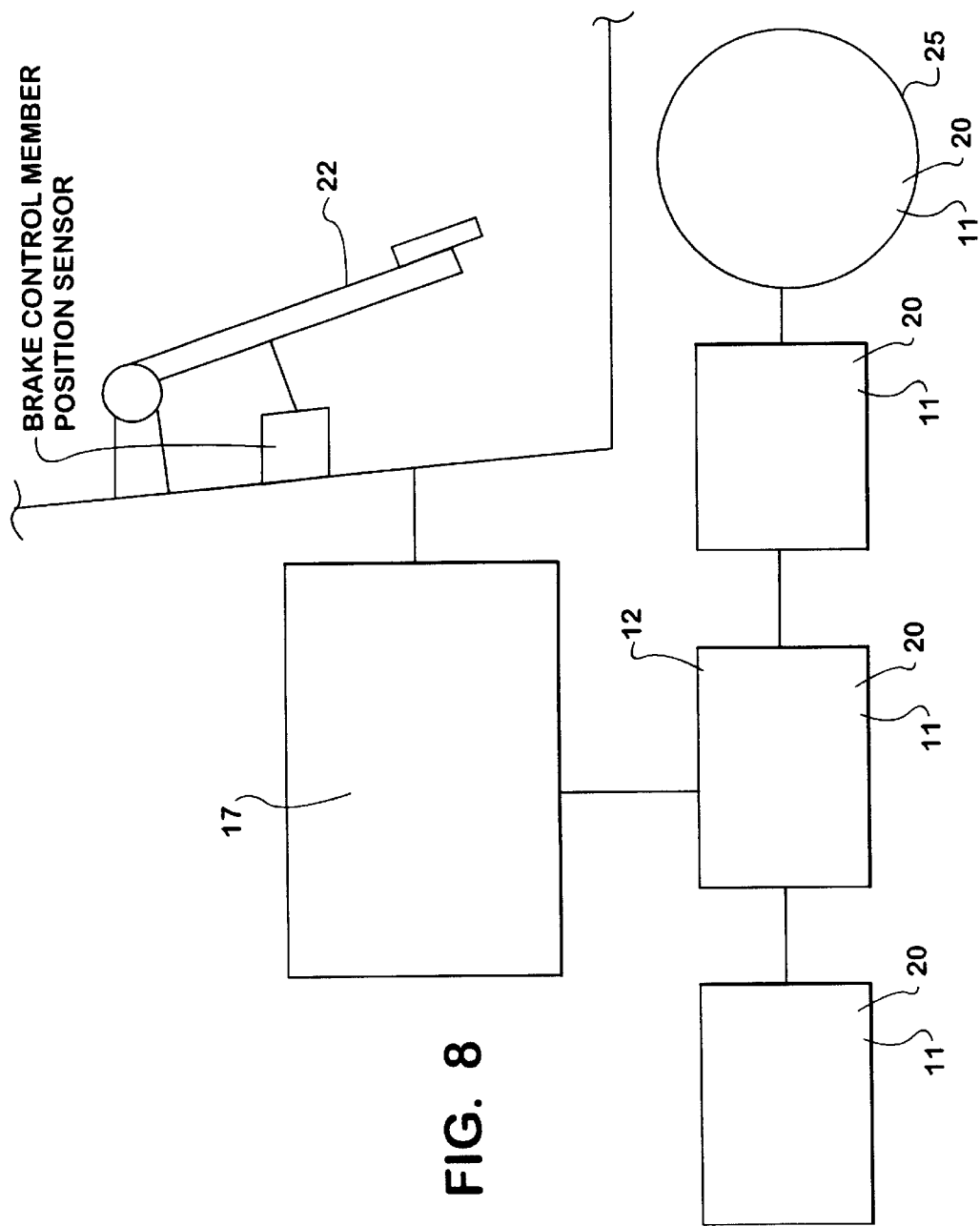
FIG. 8 is a schematic representation of a drivetrain of a vehicle that includes a drivetrain retarder and a retarder control system that is particularly well suited to enable operation of the retarder control system according to the brake triggered activation method of the present invention.
Figure 9:
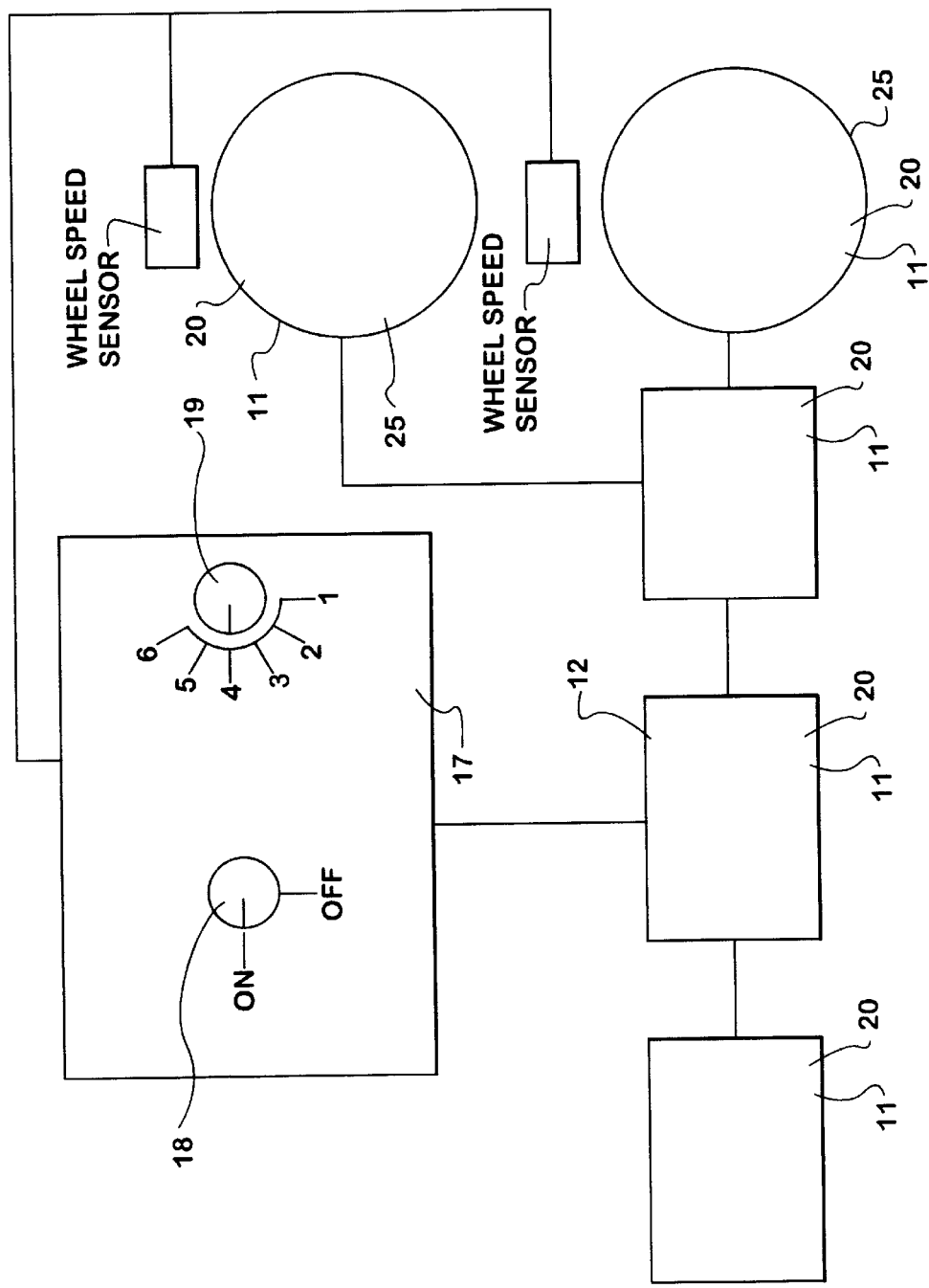
FIG. 9 is a schematic representation of a drivetrain of a vehicle that includes a drivetrain retarder and a retarder control system that is particularly well suited to enable operation of the retarder control system according to the traction controlled method of operation of the present invention.
Figure 10:
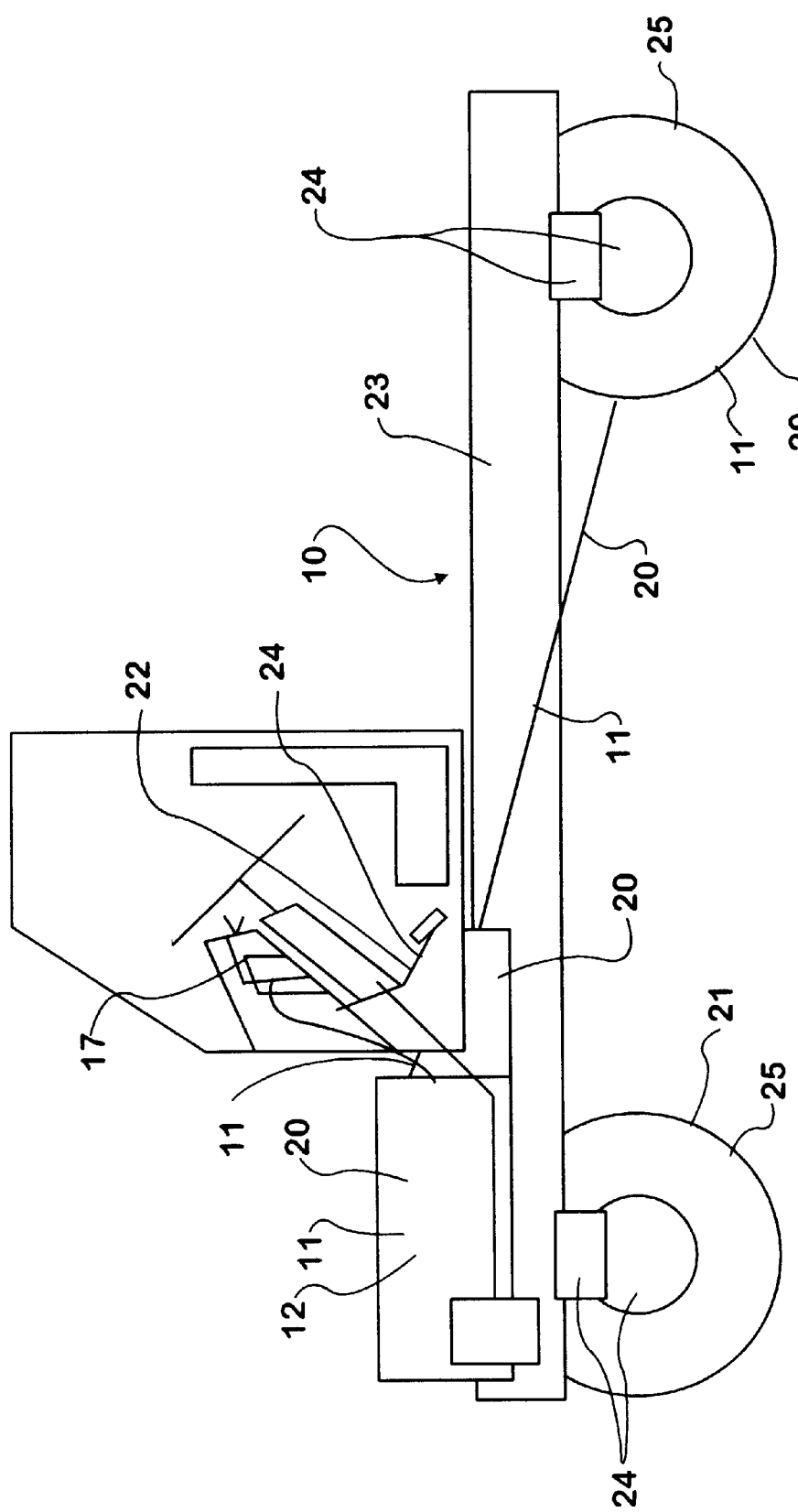
FIG. 10 is an elevational view of a vehicle with a drivetrain retarder, a retarder control system and a friction braking system.

The progressive transition method is a particularly appropriate method for operating a retarder control system 17 when the drivetrain retarder 12 that it controls is activated. For purposes of this disclosure activation of a drivetrain retarder is defined to occur when the drivetrain retarder 12 is transitioned from an operational state of off to an operational state of on. When the drivetrain retarder 12 has an operational state of off it is essentially operating at a resistance level of zero. When the drivetrain retarder 12 is subsequently activated it operates at a resistance level that is greater than zero. Retarder control systems 17, operating according to many known methods, cause an associated drivetrain retarder 12 to be operated at a relatively high resistance level immediately upon activation of the drivetrain retarder 12. FIG. 3 is a graphical representation of the resistance level at which a drivetrain retarder 12 is operated versus time according to prior art methods of operation of the retarder control system 17 that controls operation of the drivetrain retarder 12. FIG. 3 shows an immediate transition of the resistance level that a drivetrain retarder 12 is operated at from a resistance level of zero to a relatively high resistance level upon activation of the drivetrain retarder 12. FIG. 3 is exemplary of the manner in which a drivetrain retarder 12 is often operated when an associated retarder control system 17 is operated according to known methods. There are many circumstances in which it is desirable to have the operation of a drivetrain retarder 12 operated at a relatively high resistance level a short time after activation of the drivetrain retarder 12. Unfortunately, operating a drivetrain retarder 12 at a relatively high resistance level immediately upon activation of the drivetrain retarder 12 causes the vehicle 10 to undergo undesirable jerk. A smoother activation of the drivetrain retarder 12 may be accomplished by operating the retarder control system 17 of the drivetrain retarder 12 according to the progressive transition method of the present invention during a transition period starting at activation of the drivetrain retarder 12. A retarder control system 17 may be operated according to the progressive transition method to cause the resistance level at which a drivetrain retarder 12 is operated to progress from a starting resistance level at activation of the drivetrain retarder 12 to an ending resistance level at the end of a transition period. In such a situation the starting resistance level at which the drivetrain retarder 12 is operated is zero as the operational state of the drivetrain retarder 12 at the beginning of the transition period is off. When operated according to the progressive transition method at activation of the drivetrain retarder 12, a retarder control system 17 causes the resistance level at which the drivetrain retarder 12 is operated to be incremented from the starting resistance level, through one or more intermediated resistance levels, to an ending resistance level. FIGS. 4 and 5 are graphs showing a resistance level at which a drivetrain retarder 12 is operated versus time. FIGS. 4 and 5 exemplify two unique ways in which the resistance level at which the drivetrain retarder 12 is operated may be incremented according to the progressive transition method upon activation of the drivetrain retarder 12. FIG. 4 is exemplary of an embodiment of a progressive transition method in which the resistance level at which the drivetrain retarder 12 is operated is incremented through a finite number of intermediate resistance levels. FIG. 5 is exemplary of an embodiment of the progressive transition method in which the resistance level at which the drivetrain retarder 12 is operated is incremented through an infinite number of intermediate resistance levels.

The ending resistance level that a drivetrain retarder 12 is transitioned to according to the progressive transition method, at activation of the drivetrain retarder 12, may be determined by any one or more of a number of different factors. In the preferred embodiment, the method of operation of the retarder control system 17 is such that, at activation of the drivetrain retarder 12, the resistance level is incremented according to the progressive transition method until it reaches the resistance level at which a retarder resistance selector 19 of the retarder control system 17 is set. For instance, a retarder resistance selector may be set at a fifth of six possible resistance levels when a corresponding drivetrain retarder 12 is activated. In such a situation the preferred method of operation of the retarder control system 17 would include successively causing the drivetrain retarder 12 to operate at one or more of the first, second, third and fourth resistance levels before eventually causing the drivetrain retarder 12 to operate at the fifth resistance level. According to the progressive transition method of the present invention the drivetrain retarder 12 may be operated at only some or, alternatively, at all possible intermediate resistance levels between the starting resistance level and the ending resistance during the transition period. For instance, as mentioned above, the resistance level of a drivetrain retarder 12 may be incremented upon activation of the drivetrain retarder 12 from a resistance level of zero (when the operational state of the drivetrain retarder 12 is off), to one or more of a first, second, third, fourth, and eventually to a fifth of six possible resistance levels. In such an instance, the progression of the resistance level at which the drivetrain retarder 12 is operated may take on many different forms. The progression could be to the first resistance level upon activation, subsequently to the third resistance level, and then to the fifth resistance level. Alternatively, the progression could be to the third resistance level upon activation, and subsequently to the fifth resistance level. In the preferred embodiment, upon activation of the drivetrain retarder 12, the drivetrain retarder 12 is initially operated at the lowest nonzero resistance level and then incremented by the progressive transition method to each successively higher resistance level until the drivetrain retarder 12 is operated at the resistance level at which a retarder resistance selector 19 is set.

The progressive transition method of operation of a retarder control system 17 according to the present invention may also include methods of gradually transitioning the resistance level at which the drivetrain retarder 12 is operated from a starting resistance level and an ending resistance level, between which there are intermediate resistance levels, at times other than activation of the drivetrain retarder 12. For instance, the progressive transition method may be utilized to gradually transition the resistance level at which the drivetrain retarder 12 is operated upon deactivation of the drivetrain retarder 12. Deactivation of the drivetrain retarder 12 being the process of the retarder control system 17 changing the operational state of the drivetrain retarder 12 from on to off. In a situation where a retarder control system 17 deactivates a drivetrain retarder 17 in accordance with the progressive transition method, the retarder control system 17 would step the resistance level at which the drivetrain retarder 12 is operated through one or more resistance levels less than the resistance level at which the drivetrain retarder 12 is operated at upon initiation of deactivation before changing the operational state of the drivetrain retarder 12 from on to off. In the preferred embodiment, the retarder control system 17 is operated according to such an algorithm that the progressive transition method is followed any time the resistance level at which the drivetrain retarder 12 is operated is changed from a starting resistance level to an ending resistance level between which there are intermediate resistance levels. According to the progressive transition method the resistance level at which the drivetrain retarder 12 is operated is transitioned through one or more or each of the intermediate resistance levels between the starting resistance level and the ending resistance level.

Figure 15:
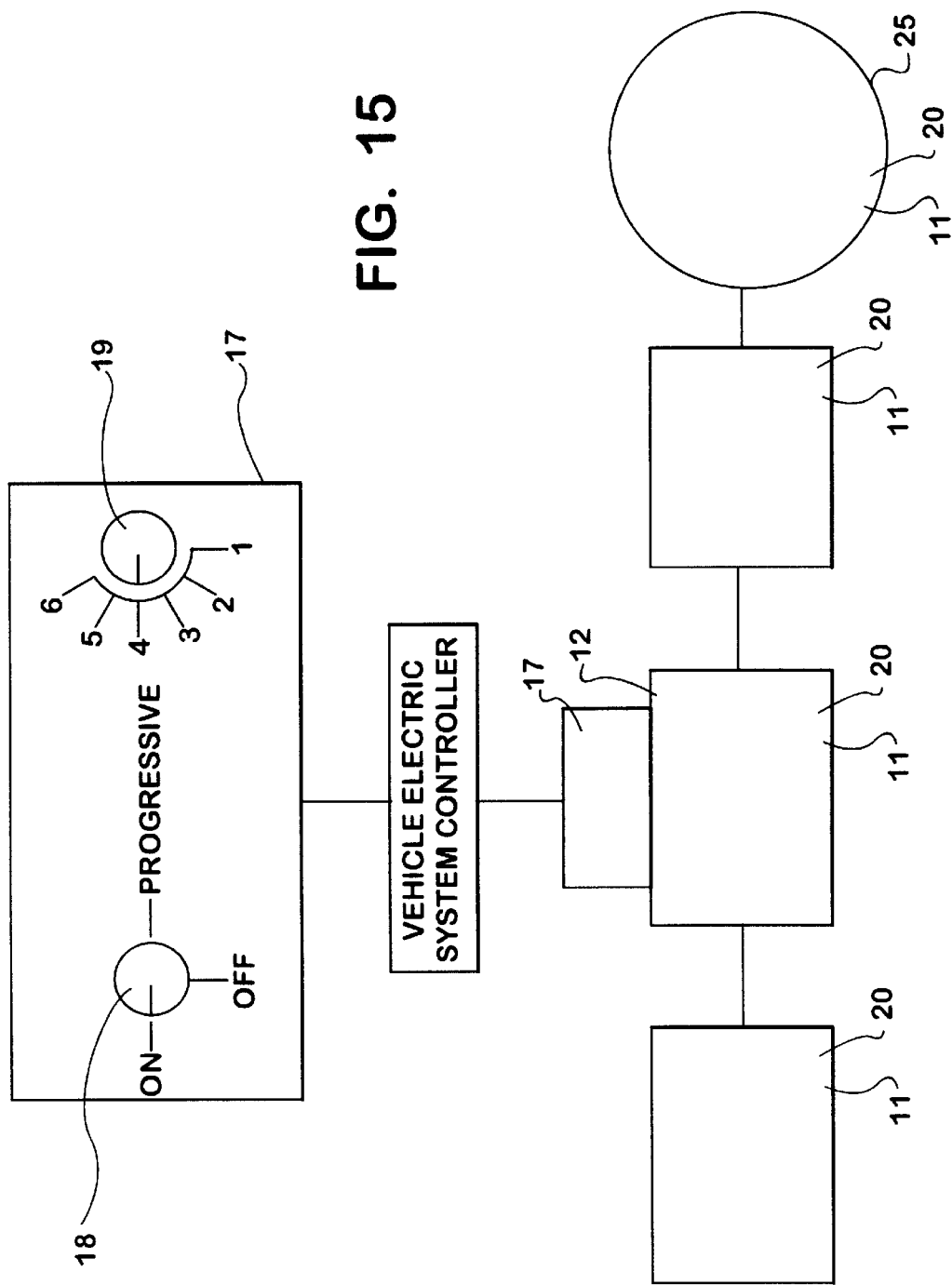
FIG. 15 is a schematic representation of a drivetrain of a vehicle that includes a drivetrain retarder and a retarder control system that is particularly well suited to enable operation of the retarder control system according to the progressive transition method of the present invention and in which the retarder state selector includes a progressive setting.

A retarder control system 17 according to the present invention may be configured in such a manner that the comprehensive method of operation of the retarder control system 17 includes operation of the retarder control system 17 according to the progressive transition method only under certain circumstances. According to such an embodiment of the present invention, the retarder control system 17 may have a progressive transition mode of operation in which the retarder control system must be before the retarder control system 17 can operate according to the progressive transition method of operation. While a retarder control system 17 that has a progressive transition mode of operation must be in the progressive transition mode of operation before it can operate according to the progressive transition method according to the present invention, a retarder control system in the progressive transition mode of operation does is not necessarily executing the steps of the progressive transition method of operation at all times. A retarder control system 17 that is in a progressive transition mode of operation is enabled to execute the steps of the progressive transition method of operation when circumstances dictate that it do so. There are many different possible factors that can affect whether or not a retarder control system 17 is in a progressive transition mode of operation. According to some embodiments of vehicles 10, retarder control systems 17, and methods of operation thereof according to the present invention the retarder control system 17 may be constantly enabled to execute the steps of the progressive transition method and according to such embodiments of the present invention the retarder control system 17 would be considered to be in the progressive transition mode of operation at all times. According to one embodiment of the present invention the retarder control system 17 comprises a retarder state selector 18 that has on, off, and progressive settings. A retarder control system 17 with such a retarder state selector 18 is illustrated in FIG. 15. According to this embodiment of the present invention the comprehensive method of operation of the retarder control system 17 is such that the retarder control system is only in the progressive transition mode of operation when the retarder state selector 18 is set to its progressive setting.

Figure 11A:
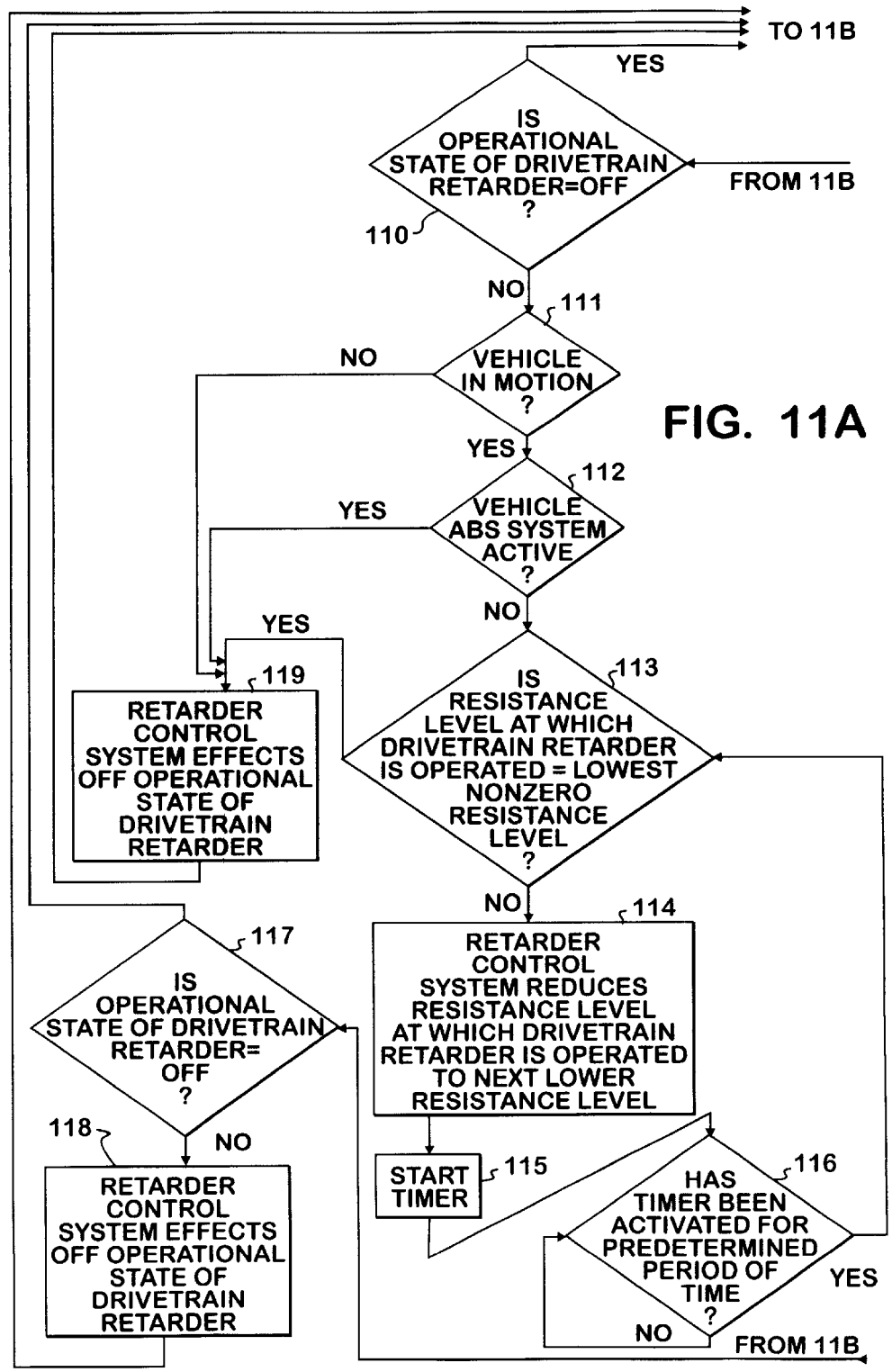
FIG. 11 is a flow chart outlining the process of one embodiment of the progressive transition method of operation of a retarder control system according to the present invention.
Figure 11B:
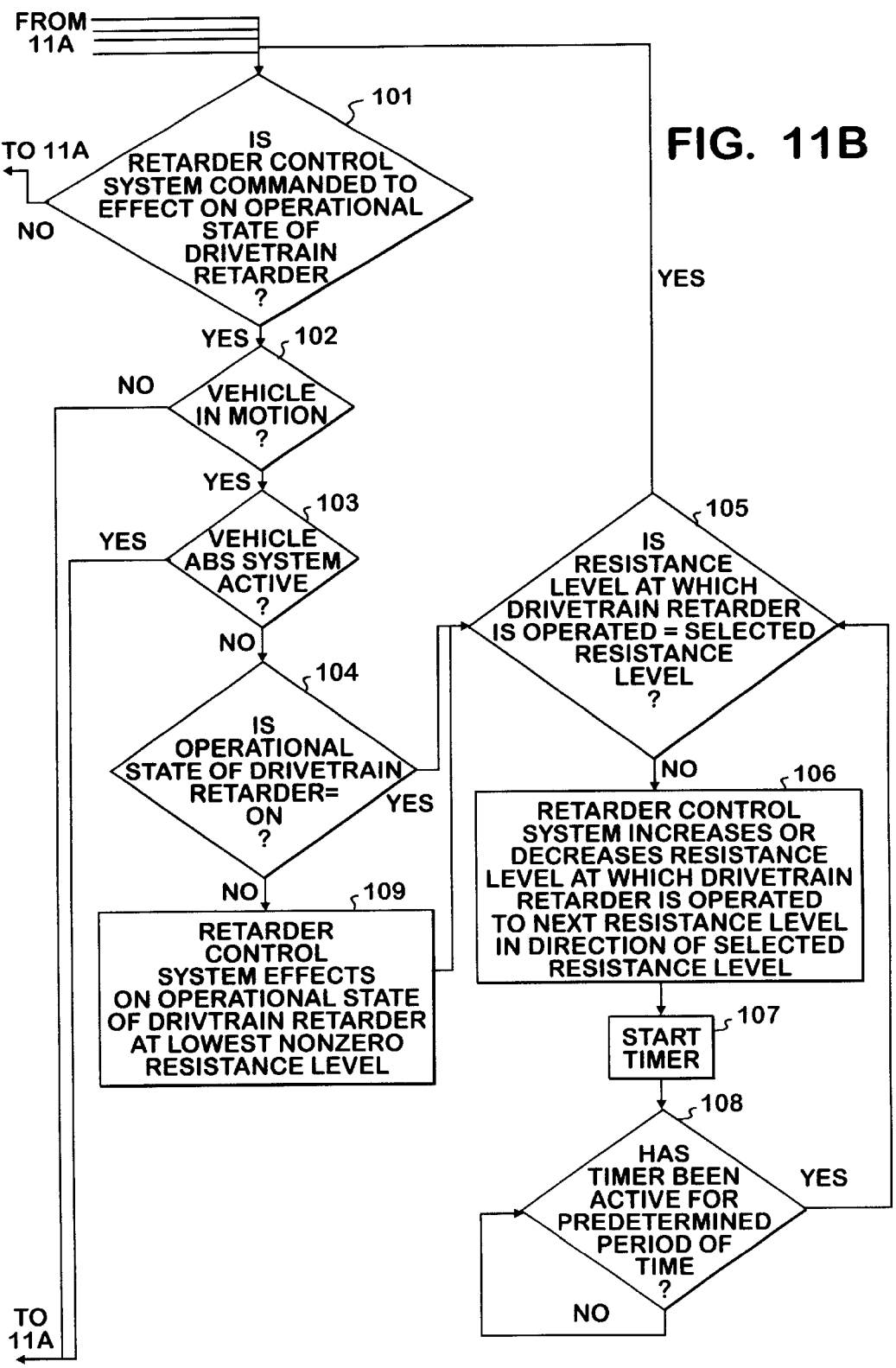
Figure 12A:
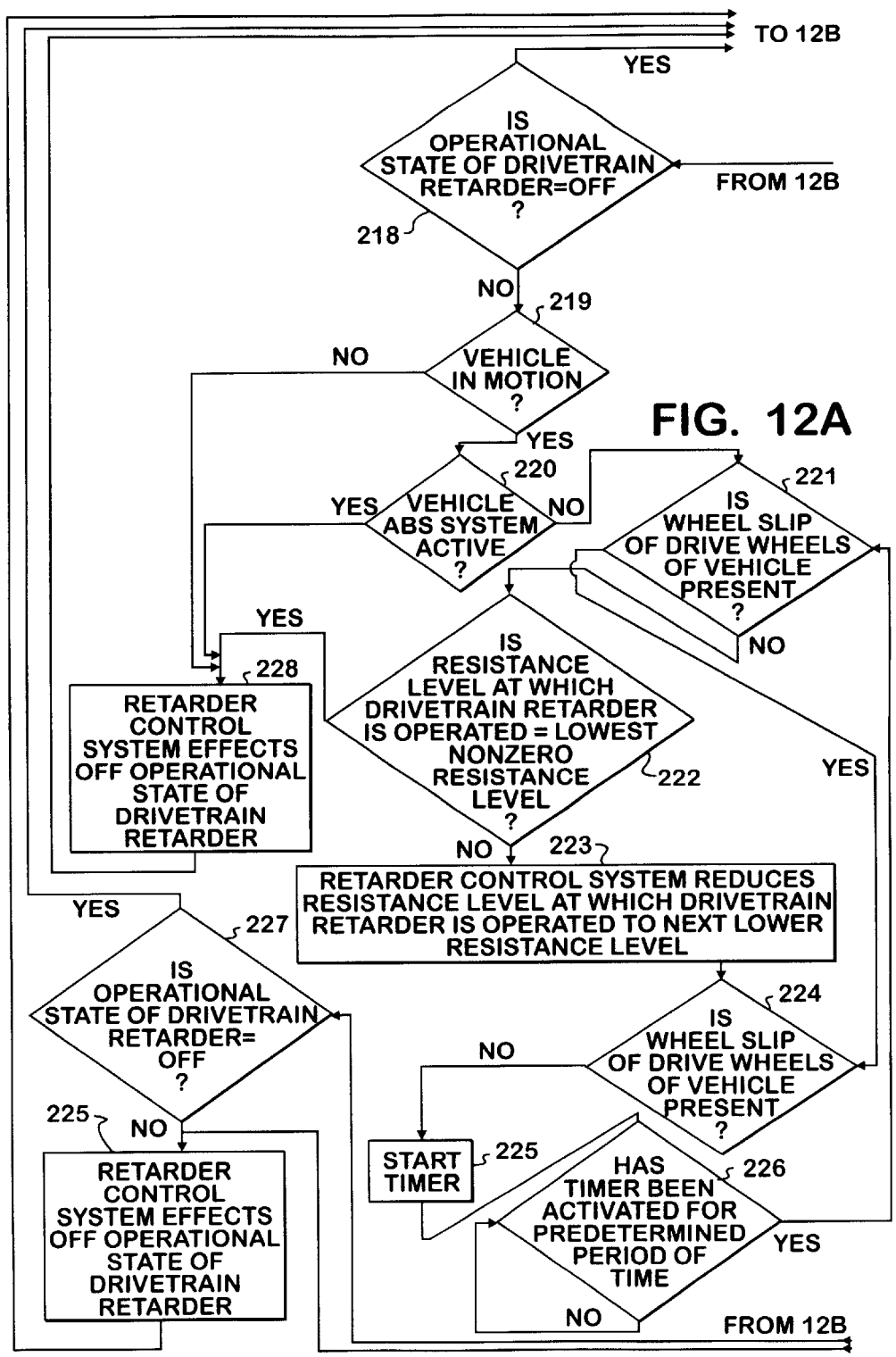
FIG. 12 is a flow chart outlining the process of one embodiment of a method of operation of a retarder control system that includes both an embodiment of the traction controlled method and an embodiment of the progressive transition method.
Figure 12B:
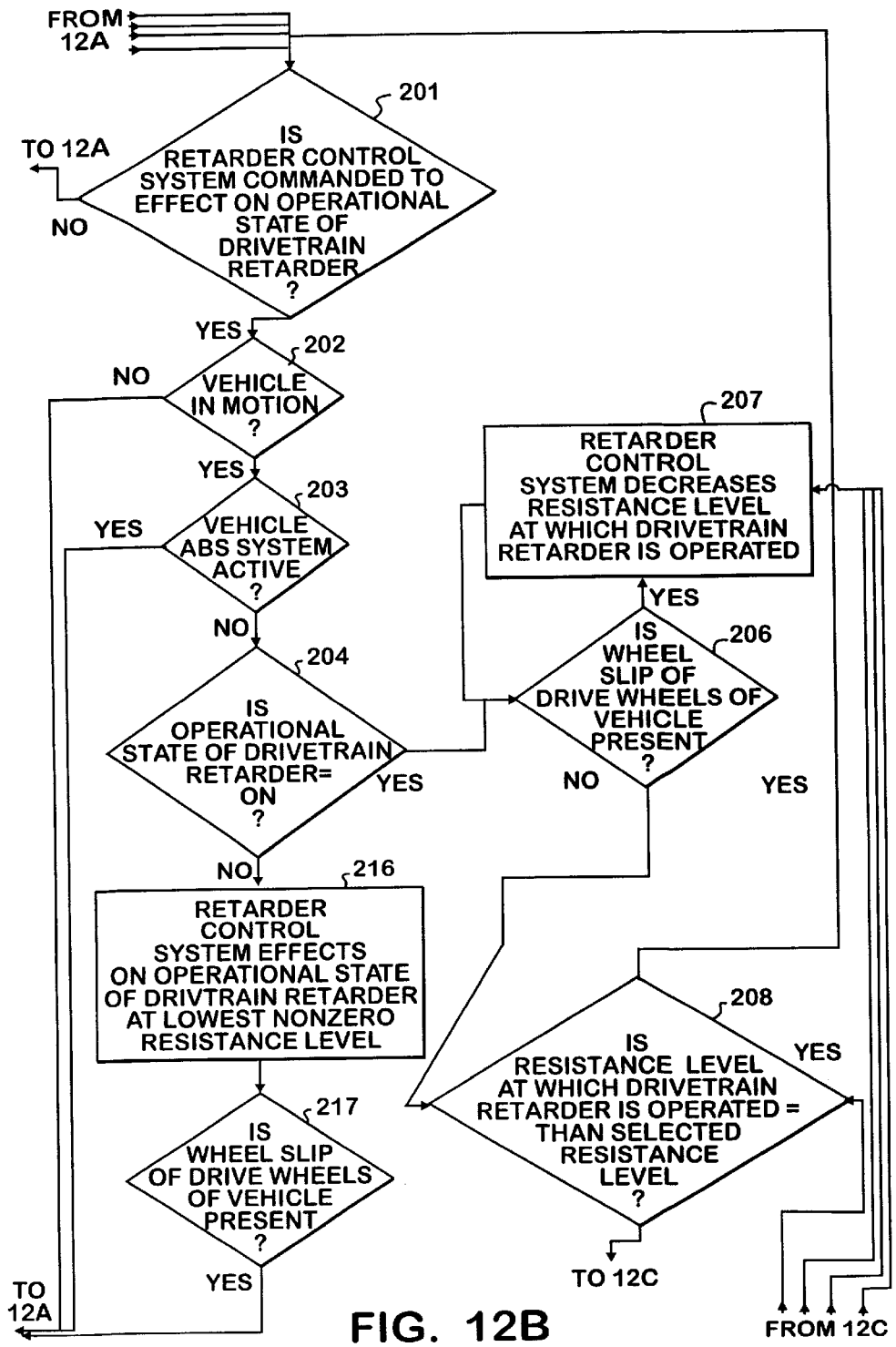
Figure 12C:
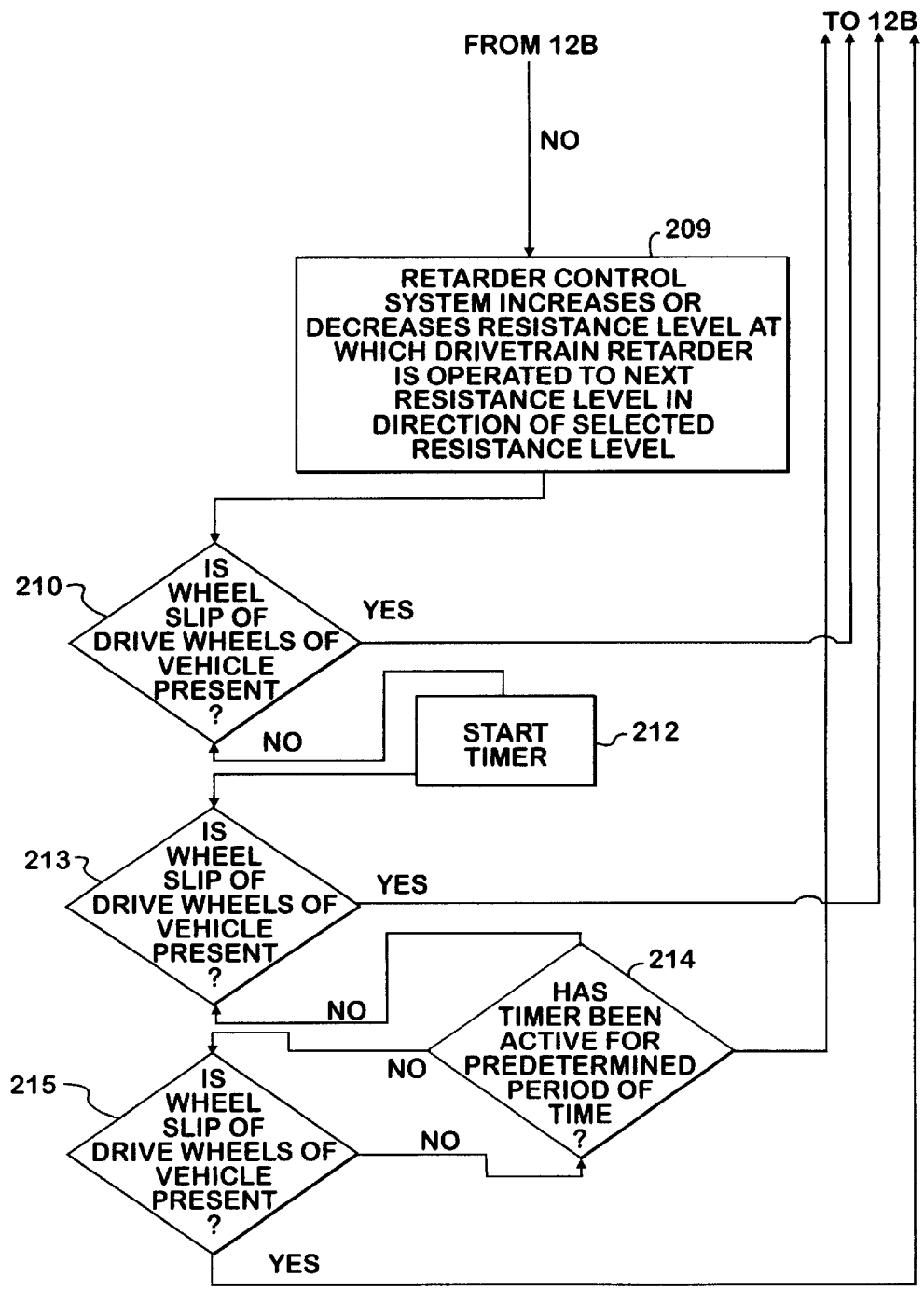
Figure 13:
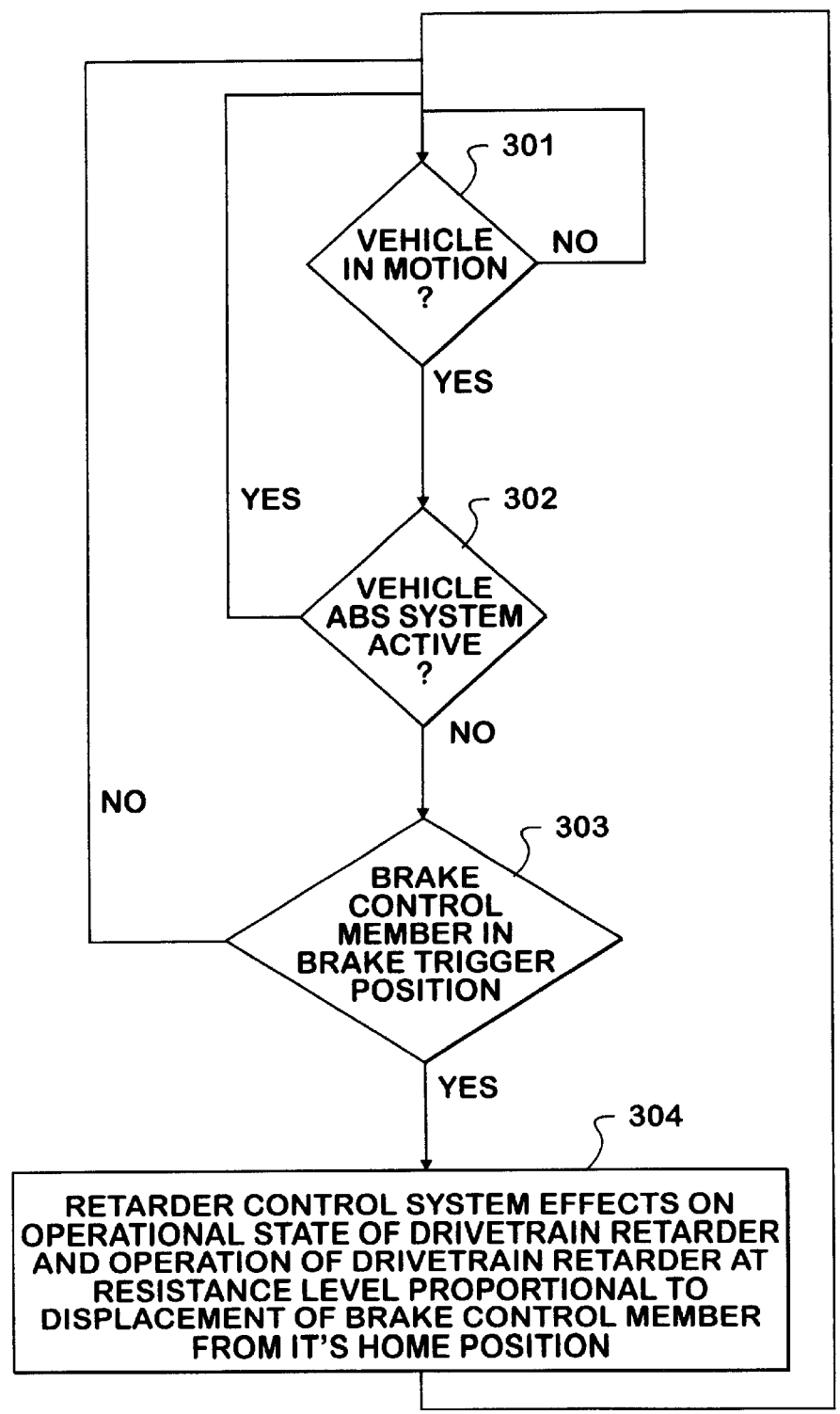
FIG. 13 is a flow chart outlining the process of one embodiment of the brake triggered activation method of operation of a retarder control system according to the present invention.

The general principles of the progressive transition method of operation of a retarder control system 17 according to the present invention can be further better understood by referencing FIG. 11, which is a flow chart that outlines the process of one embodiment of the progressive transition method of operation of a retarder control system 17 according to the present invention. FIG. 11 applies to a vehicle that has an ABS type friction braking system. The progressive transition method of FIG. 11 is also applicable only to retarder control systems 17 and vehicles 10 configured in such a manner that the retarder control system 17 is apprised of whether or not the vehicle 10 is in motion and whether or not the ABS system is active (modulating the braking effort of the friction brake system to prevent wheel slip). Additionally, as with all methods of operation of a retarder control system 17 according to the present invention, the progressive transition method of FIG. 11 applies only to vehicles 10 that have a drivetrain retarders 12 with multiple discrete resistance levels at which it can be operated. Of course it will be understood that a drivetrain retarder 12 that can be operated within a continuous range of resistance levels between a low resistance level and a high resistance level is considered to be operable at an infinite number of discrete resistance levels between the low resistance level and the high resistance level. The progressive transition method of FIG. 11 also applies to a vehicle 10 with a retarder control system 17 configured in such a manner that the retarder control system 17 is apprised of a selected resistance level of the drivetrain retarder 12. As can be easily ascertained by studying FIG. 11 the selected resistance level is not necessarily the same as the resistance level at which the drivetrain retarder 12 is operated at any given time. The selected resistance level is a resistance level at which the drivetrain retarder 12 would be operated absent a contrary decision by the retarder control system 17 as a result of the logic of one or more of the novel methods of operation of the retarder control system 17 of the present invention, which methods according to the present invention are a subset of a comprehensive method of operation of the retarder control system 17. As is mentioned elsewhere in this disclosure the selected resistance level of the drivetrain retarder 12 may be determined automatically by portions of the control algorithm for the retarder control system 17 other than portions of the control algorithm comprised by the present invention, In the case of most vehicles 10, retarder control systems 17, and methods of operation thereof according to the present invention, the selected resistance level will simply be set by a retarder resistance selector 19 that is manually operated by a driver of the vehicle 10. In a similar manner, the algorithm according to which the retarder control system 17 operates may automatically determine the commanded operational state of the drivetrain retarder 12. In the case of most of the vehicles 10, retarder control systems 17, and methods of operation thereof according to the present invention, the commanded operational state of the drivetrain retarder 12 will be determined by the operational state of a retarder state selector 18 that is manually operated by a driver of the vehicle 10. As can be seen in FIGS. 11, 12, and 13 the methods of operation of the retarder control system 17 according to the present invention may cause the retarder control system 17 to override the commanded operational state of the drivetrain retarder 12 when the commanded operational state is on and the vehicle 10 is not in motion or the ABS system of the vehicle 10 is active.

For exemplary purposes, the process of the progressive transition method of FIG. 11 will be discussed now. The progressive transition method of FIG. 11 starts at 101 where the retarder control system 17 ascertains whether or not it is being commanded to effect an operational state of on for the drivetrain retarder 12. If the retarder control system 17 is being commanded at 101 to effect an on operational state of the drivetrain retarder 12, a determination is made at 102 if the vehicle 10 is in motion. If the vehicle 10 is in motion, a determination is made at 103 if the vehicle ABS system is active. If the vehicle ABS system is not active a determination is made at 104 whether or not the actual operational state of the drivetrain retarder 12 is on. If it is determined at 104 that the actual operational state of the drivetrain retarder 12 is off, at 109 the retarder control system 17 causes the operational state of the drivetrain retarder 12 to become on and the resistance level at which the drivetrain retarder 12 is operated to be the lowest non-zero resistance level of the drivetrain retarder 12. A situation where it is determined at 101 that the retarder control system 17 is commanded to effect an on operational state of the drivetrain retarder 12 and where it is further determined at 104 that the actual operational state of the drivetrain retarder 12 is off could occur shortly after a change of circumstances from one in which the retarder control system 17 is commanded to effect an off operational state of the drivetrain retarder 12 to one in which the retarder control system is commanded to effect an on operational state of the drivetrain retarder 12. If at 104 it is determined that the actual operational state of the drivetrain retarder 12 is on, then it is determined at 105 if the resistance level at which the drivetrain retarder 12 is operated is equal to the selected resistance level. If it is determined at 105 that the resistance level at which the drivetrain retarder 12 is operated is equal to the selected resistance level, execution of the control algorithm returns to 101 where it is determined whether or not the retarder control system 17 is being commanded to effect an operational state of on of the drivetrain retarder 12. Alternatively, if it is determined at 105 that the resistance level at which the drivetrain retarder 12 is operated is not equal to the selected resistance level the retarder control system 17 proceeds to 106 where the retarder control system 17 causes the resistance level at which the drivetrain retarder 12 is operated to be stepped to the next resistance level in the direction (higher or lower) toward the selected resistance level. For instance, if the selected resistance level is level 5 and the drivetrain retarder 12 is operating at level 3 the retarder control system 17 steps the resistance level at which the drivetrain retarder 12 is operated to level 4. After stepping the resistance level at which the drivetrain retarder 12 is operated to the next resistance level in the direction toward the selected resistance level a timer is started at 107. After the timer is started at 107 the retarder control system 17 goes into a wait loop at 108 until the timer has been activated for a predetermined period of time that it is desired to wait between changes of the resistance level at which the drivetrain retarder 12 is operated according to the progressive transition method of the present invention. After the predetermined period of activation of the timer has elapsed at 108, it is once again determined at 105 whether or not the resistance level at which the drivetrain retarder 12 is operated is equal to the selected resistance level and the algorithm continues from block 105 in the same manner as described above.

The control algorithm defined by the flow chart of FIG. 11 also provides for progressive downward stepping of the resistance level at which the drivetrain retarder 12 is operated in circumstances when the retarder control system 17 is initially commanded to effect an on operational state of the drivetrain retarder 12 and is subsequently commanded to effect an off operational state of the drivetrain retarder 12. If at 101 it is determined that the retarder control system 17 is not commanded to effect an on operational state of the drivetrain retarder 12, it is determined at 110 whether the actual operational state of the drivetrain retarder 12 is off. If it is determined at 110 that the actual operational state of the drivetrain retarder 12 is off, the control algorithm starts anew at 101. Alternatively, if it is determined at 110 that the actual operational state of the drivetrain retarder 12 is not off, it is determined at 111 if the vehicle 10 is in motion. If it is determined at 111 that the vehicle 10 is in motion, it is determined at 112 if the vehicle ABS system is active. If it is determined at 112 that the vehicle ABS system is not active, it is determined at 113 if the resistance level at which the drivetrain retarder 12 is operated is the lowest non-zero resistance level at which the drivetrain retarder 12 can be operated. If at 113 it is determined that the resistance level at which the drivetrain retarder 12 is operated is equal to the lowest non-zero resistance level at which the drivetrain retarder 12 can be operated, the retarder control system 17 causes the operational state of the drivetrain retarder 12 to become off at 119. If, alternatively, it is determined at 113 that the resistance level at which the drivetrain retarder 12 is operated is not the lowest non-zero resistance level at which the drivetrain retarder 12 can be operated, at 114 the retarder control system 17 steps the resistance level at which the drivetrain retarder 12 is operated to the next lower resistance level at which the drivetrain retarder 12 can be operated. After stepping down the resistance level at which drivetrain retarder 12 is operated at 114 the retarder control system 17 starts a timer at 115 and subsequently starts a wait loop at 116 that is executed until the timer has been activated for a predetermined period of time for which it is desired to operate the drivetrain retarder 12 at each resistance level as the resistance level at which it is operated is stepped down upon the retarder control system 17 being commanded to effect an off operational state of the drivetrain retarder 12.

After it has been determined at 116 that the timer has been activated for the predetermined period of time, it is once again determined at 113 whether or not the resistance level at which the drivetrain retarder 12 is operated is equal to the lowest non-zero resistance level at which the drivetrain retarder 12 can be operated.

The control algorithm defined by the flow chart of FIG. 11 also includes provisions for appropriate operation of the retarder control system 17 in the event that the vehicle 10 is not in motion or that the ABS system of the vehicle 10 is operational. It can be seen in FIG. 11 that, if at 102 or 111 it is determined that the vehicle 10 is not in motion the retarder control system 17 cause the operational state of the drivetrain retarder 12 to become off at either 118 or 119. Operation of the retarder control system 17 in such a manner is desirable because operation of the drivetrain retarder 12 in its on operational state while the vehicle 10 is not in motion serves no purpose. Similarly, if it is determined at 103 or 112 that the ABS system of the vehicle 10 is active the retarder control system 17 causes the operational state of the drivetrain retarder 12 to become off at 118 or 119. Operation of the retarder control system 17 in such a manner is desirable because operation of the drivetrain retarder 12 in its on operational state while the ABS system of the vehicle 10 makes it highly challenging for the ABS system to properly control actuation of the vehicle's 10 friction brakes 24.

It will, of course, be understood that the control algorithm defined by the flow chart of FIG. 11 is only one specific example of many possible embodiments of a progressive transition method of operation of a retarder control system 17 according to the present invention. A control algorithm for the progressive transition method of operation of a retarder control system 17 according to the present invention may comprise less elements or more elements than the example set forth in FIG. 11. For example such a control algorithm need not include elements such as 102, 103, 111, or 112, which check for motion of the vehicle 10 and ABS system activity. Alternatively, such a control algorithm may contain more points at which the retarder control system 17 checks for motion of the vehicle 10 and/or ABS system activity. In fact a retarder control system 17 may be operated according to an embodiment of the progressive transition method in which the ABS system is constantly monitored for activity and any time that ABS system is activity is detected the retarder control system 17 causes the operational state of the drivetrain retarder 12 to become off. Some embodiments of the progressive transition method of control of a retarder control system 17 may be used with vehicles 10 that do not have ABS systems and, may therefore, not include any logic dependent upon ABS system activity. The defining characteristic of a control algorithm according to the progressive transition method of the present invention is the inclusion of the progressive transition logic one example of which is included in blocks 105, 106, 107, and 108 of FIG. 11 and another example of which is included in blocks 113, 114, 115, and 116 of FIG. 11. It will of course, also be understood that a control algorithm, including the one exemplified by the flow chart of FIG. 11, for effecting operation of a retarder control system 17 according to a brake triggered method of operation may be executed simultaneous to other control algorithms which are subsets of the entire control algorithm for the retarder control system 17.

Many types of vehicles 10 have friction braking systems 24 that can be operated to resist relative motion between drivetrain components 20 and structural components 23 of the vehicle 10. Friction braking systems 24 generally comprise one or more friction elements such as brake pads or shoes that are mounted to the structural components 23 of the vehicle in such a manner that they are substantially fixed against movement relative to the structural components 23 of the vehicle 10. When such friction braking systems 24 are activated., friction elements are forced into frictional engagement with drivetrain components 20 of the vehicle 10 and resist relative motion between the drivetrain components 20 that they are frictionally engaged to and the structural components 23 of the vehicle 10 that they are mounted to. Friction braking systems 24 of vehicles 10 generally comprise a brake control member 22 that an operator of the vehicle 10 may operate in order to activate the friction braking system 24 of the vehicle 10 and, retard the motion of the vehicle 10. Brake control members 22 of friction braking systems 24 are generally mounted to the vehicle 10 in such a manner that they are moveable from a home position, in which they are positioned unless acted upon, to actuated positions. In general friction braking systems 24 of vehicles 10 are constructed in a manner such that the magnitude of resistance to relative motion between drivetrain components 20 and structural components 23 of the vehicle 10 is proportional to the displacement of the brake control member 22 from its home position. An example of such a brake control member 22 is the brake pedal 26 commonly found in many vehicles 10. Many different designs of such friction braking systems 24 and application of such friction braking systems 24 to many different constructions of vehicles 10 are well known.

A second novel subset of the method of operation of the present invention of a retarder control system 17 is a brake triggered activation. According to the brake triggered activation subset of the method of operation of a retarder control system 17 control of a drivetrain retarder 12 that is controlled by the retarder control system 17 is dependent upon, among other factors, the position of a brake control member 22 of a vehicle 10. According to the brake triggered activation method of operation of a retarder control system 17, under certain circumstances, the retarder control system 17 activates an associated drivetrain retarder 12 (causes it to have an operational state of on) when a brake control member 22 is located in certain positions. Those certain positions of the brake control member 22 that cause activation of a drivetrain retarder 12 will hereinafter be referred to as retarder trigger positions. The brake triggered activation method of operation of a retarder control system 17 is particularly useful for causing a drivetrain retarder 12 to assist a friction braking system 24 of a vehicle 10 in retarding the motion of the vehicle 10 when a brake control member 22 of the vehicle 10 is displaced from its home position to one of its actuated positions. Thus, in general, the positions of the brake control member 22 that are retarder trigger positions are the same positions of the brake control member 22 that are actuated positions with respect to the friction braking system 24 of the vehicle.

Figure 2:
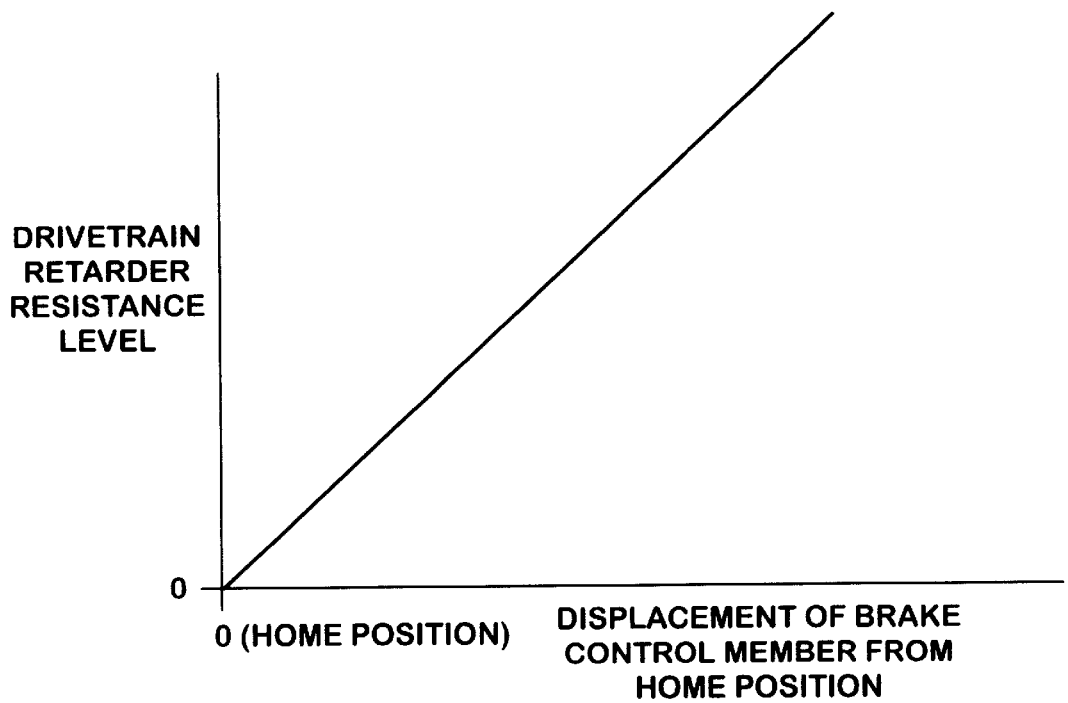
FIG. 2 is a graphical representation of one possible relationship between the position of a brake control member and retarder resistance level when operated according to the brake triggered activation method.

A retarder control system 17 operating according to the brake trigger activation method may control the resistance level at which the drivetrain retarder 12 is operated dependent, at least partially, upon the position of the brake control member 22. When a drivetrain retarder 12 has been activated as a result, at least in part, of a brake control member 22 being located in a retarder trigger position the resistance level at which the drivetrain retarder 12 is operated may be dependent upon the position of the brake control member 22. In the preferred embodiment, for instance, any position except the home position of the brake control member 22 is a retarder trigger position. In the preferred embodiment, a retarder control system 17 operating according to the brake trigger activation method controls a drivetrain retarder 12 that has a resistance level that can be infinitely adjusted between a lower and an upper limit. In the preferred embodiment, when the drivetrain retarder 12 has been activated as a result, at least partially, of the brake control member 22 being located at a retarder trigger position, the resistance level at which the drivetrain retarder 12 is operated is proportional to the displacement of the brake control member 22 from its home position. Such a relationship is illustrated in FIG. 2 which is exemplary of a preferred relationship between the position of a brake control member 22 and the resistance level at which a drivetrain retarder 12 would be operated when the drivetrain retarder 12 has been activated according to the brake triggered activation method. It should be understood that the brake triggered activation method would likely be only a subset of an entire method according to the present invention of operating a retarder control system 17. Therefore, obviously, the activation and control of the resistance level of a drivetrain retarder 12 may be governed by subsets of the method of the present invention other than the brake triggered activation method.

The general principles of the brake triggered activation method of operation of a retarder control system 17 according to the present invention can be further better understood by referencing FIG. 13, which is a flow chart that outlines the process of one embodiment of the brake triggered activation method of operation of a retarder control system 17 according to the present invention. FIG. 13 applies to a vehicle 10 with an ABS type friction brake system 24. The brake triggered activation method of FIG. 11 is also only applicable to vehicles 10 that have retarder control systems 17 that are apprised of whether or not the vehicle 10 is in motion and whether or not the ABS system is active (modulating the braking effort of the friction brake system to prevent wheel slip). The brake triggered activation method of FIG. 13 also applies only to vehicles 10 that have means through which the retarder control system 17 can be apprised of whether or not the brake control member 22 is in a brake trigger position and the displacement of the brake control member 22 from its home position.

For exemplary purposes the control algorithm of FIG. 13 for effecting a brake triggered method of operation of a retarder control system 17 will now be discussed in detail. At 301 the retarder control system 17 ascertains whether or not the vehicle 10 is in motion, If at 301 the retarder control system 17 determines that the vehicle 10 is not in motion the retarder control system 17 returns to block 301, because if the vehicle 10 is not in motion it is senseless for the drivetrain retarder 12 to have an operational state of on. If at 301 the retarder control system 17 determines that the vehicle 10 is in motion, a determination is made at 302 whether or not the ABS system of the vehicle 10 is active. If it is determined at 302 that the ABS system of the vehicle 10 is active, the retarder control system 17 returns to block 301 because operation of a drivetrain retarder 12 and the ABS system of the vehicle 10 at the same time makes it very challenging for the ABS system of the vehicle 10 to properly modulate the braking force of the friction brakes 24 and prevent wheel slip of the vehicle 10. If at 302 it is determined that the ABS system of the vehicle 10 is not active, a determination is made at 303 as to whether or not the brake control member 22 of the vehicle 10 is in a brake trigger position. If at 303 it is determined that the brake control member 22 of the vehicle 10 is not in a brake trigger position, the retarder control system 17 returns to 301. If at 303 it is determined that the brake control member 22 of the vehicle 10 is in a brake trigger position, at 304 the retarder control system 17 cause the drivetrain retarder 12 to have an operational state of on and to operate at a resistance level that is proportional to the displacement of the brake control member 22 from its home position. Thereafter the retarder control system 17 returns to 301 and execution of the brake triggered activation method of operation of the retarder control system 17 begins anew.

It will of course be understood that the embodiment of a brake triggered activation method of operation defined by the flow chart of FIG. 13 is exemplary of only one of many possible embodiments of the brake triggered activation method of operation according to the present invention. For instance a brake triggered activation method of operation of retarder control system 17 may be utilized on a vehicle 10 that does not have an ABS system, in which case block 302 of the flow chart would not be present. The defining characteristic of a control algorithm for effecting operation of a retarder control system 17 according to a brake triggered activation method is that it causes the retarder control system 17 to effect operation of the drivetrain retarder 12 of the vehicle 10 at a resistance level proportional to the displacement of the brake control member 22 of the vehicle 10 from the home position thereof. It will of course, also be understood that a control algorithm, including the one exemplified by the flow chart of FIG. 13, for effecting operation of a retarder control system 17 according to a brake triggered method of operation may be executed simultaneous to other control algorithms which are subsets of the entire control algorithm for the retarder control system 17.

A third unique subset that may be included in the method of operation of the present invention of a retarder control system 17 is a traction controlled method of operation of a retarder control system 17. In certain circumstances operation of a drivetrain retarder 12 can provide enough resistance to drivetrain components 20 that wheel slip is initiated in wheels 25 of the vehicle 10 that are coupled to the drivetrain retarder 12. The wheel slip condition induced in such a manner by operation of a drivetrain retarder 12 is similar to the wheel slip condition that can be induced by excessive braking force of friction braking systems that are not of the anti-lock braking system type. Such wheel slip is undesirable as it makes it more difficult to control the motion of the vehicle 10. According to the traction controlled method of operation of a retarder control system 17, when a drivetrain retarder 12 is in an operational state of on, the retarder control system 17 controls the resistance level at which the drivetrain retarder 12 is operated dependent upon a wheel slip condition of the vehicle 10. According to the traction controlled method of operation, when the drivetrain retarder 12 is in an operational state of on and the wheels 25 that are coupled to the drivetrain retarder 12 are not experiencing wheel slip, the drivetrain retarder 12 is operated at a selected resistance level. The magnitude of the selected resistance level at which a drivetrain retarder 12 is operated when wheel slip is not occurring may be influenced by any number of factors some of which are discussed above. For example, under certain circumstances, the selected resistance level that the drivetrain retarder 12 is operated at may be a resistance level at which an operator controlled retarder resistance selector 19 is set. Under other circumstances the selected resistance level at which the drivetrain retarder 12 is operated may be determined partially or fully automatically by the retarder control system 17 that controls the drivetrain retarder 12. According to the traction controlled method of operation, when the drivetrain retarder 12 is in an on operational state and the wheels 25 that are coupled to the drivetrain retarder 12 are experiencing wheel slip the resistance level at which the drivetrain retarder 12 is operated is successively reduced until the wheel slip condition ceases to exist. The reduced resistance level, as compared to the selected resistance level, at which the drivetrain retarder 12 operates in order to prevent wheel slip may be thought of as a traction limited resistance level. In the simplest embodiment of the traction controlled method of operation of a retarder control system 17 according to the present invention, when wheel slip of the drive wheels of the vehicle 10 is detected, the retarder control system 17 effects an off operational state of the drivetrain retarder 12. For purposes of this disclosure a drivetrain retarder 12 with an off operational state is considered to be operating a resistance level of zero. While it is well known for retarder control systems 17 to effect an off operational state of the drivetrain retarder 12 when an ABS braking system of the vehicle 10 is actively modulating braking force applied to the wheels of the vehicle 10, it is not known prior to this invention for a retarder control system 17 to effect an off operational state of a drivetrain retarder 12 when wheel slip of the drive wheels occurs absent operation of the friction brakes 24 of the vehicle 10.

According to the preferred embodiment of the traction controlled method of operation of a retarder control system 17 according to the present invention, once a retarder control system 17 operating in such a manner has reduced the resistance level at which a drivetrain retarder 12 is operated to the traction limited resistance level it maintains the traction limited resistance level as close as possible to the selected resistance level without inducing sustained wheel slip. This method of reducing the resistance level at which the drivetrain retarder 12 is operated in order to eliminate wheel slip of the wheels 25 that are coupled to it is very similar to the method of modulating braking forces at various wheels 25 that an anti-lock braking system performs in order to eliminate wheel slip. In order that a retarder control system 17 operate according to the traction controlled method of operation it is necessary that it be configured in such a manner that wheel slip of the wheels 25 that are coupled to the drivetrain retarder 12 may be detected. In the preferred embodiment, the retarder control system 17 is included in a vehicle that has an anti-lock braking system type friction braking system 24. In the preferred embodiment the retarder control system 17 either comprises or is in communication with a microcomputer device that is in communication with the wheel speed sensors of the anti-lock braking system of the vehicle 10. In this embodiment, a wheel slip condition of the wheels 25 that are coupled to the drivetrain retarder 12 is determined by the microcomputer device utilizing the wheel speed signals received from the wheel speed sensors along with one of many known types of algorithms for determining wheel slip using such wheel speed signals. In the preferred embodiment, the microcomputer of the retarder control system 17 that determines whether or not wheel slip of the driven wheels of the vehicle 10 is occurring is an Electrical System Controller (ESC) of the vehicle 10 as described in greater detail below.

Following is a description of specific events that could occur when a specific retarder control system 17 operates according to the traction controlled method of operation in a specific set of circumstances. This description is intended to aid in understanding of the general principals of the method by which a retarder control system 17 maintains the traction limited resistance level at which a drivetrain retarder 12 is operated as close as possible to the selected resistance level without inducing sustained wheel slip of the driven wheels of the vehicle. It should be understood that this description is exemplary only and many details of the operation of a retarder control system 17 according to the traction controlled method may vary from the details of the following description without departing from the spirit and scope of the invention. A retarder control system 17 operating according to the traction control method may cause a drivetrain retarder 12 to have an operational state of on and to operate at a selected resistance level which is a fifth of six possible resistance levels at which the drivetrain retarder 12 may be operated. If a retarder control system 17 operates in such a manner and wheel slip of the wheels 25 that are coupled to the drivetrain retarder 12 occurs, the retarder control system 17 will reduce the resistance level at which the drivetrain retarder 12 is operated. The retarder control system 17 would, in such a situation reduce the resistance level at which the drivetrain retarder 12 is operated from the fifth to the fourth of the six possible resistance levels at which the drivetrain retarder 12 may be operated. If, after the retarder control system 17 reduces the resistance level at which the drivetrain retarder 12 is operated to the fourth of the six possible resistance levels, wheel slip of the driven wheels is still occurring, the retarder control system 17 would reduce the resistance level at which the drivetrain retarder 12 is operated to the third resistance level. If after reducing the operation of the drivetrain retarder 12 to the third resistance level wheel slip of the driven wheels no longer occurs the retarder control system 17 maintains the operation of the drivetrain retarder 12 at the third resistance level for a predetermined period of time or until wheel slip of the driven wheels does occur. If the resistance level of the drivetrain retarder 12 is maintained at the third resistance level for the predetermined period of time and no wheel slip of the driven wheels occurs, the retarder control system 17 increases the resistance level at which the drivetrain retarder 12 is operated to the fourth resistance (toward the selected resistance level which is the fifth) level until wheel slip occurs or a similar predetermined period of time elapses. Once the retarder control system 17 has reduced the resistance level at which the drivetrain retarder 12 is operated from the selected resistance level to a traction limited resistance level as a result of occurrence of wheel slip it modulates the resistance level in this general manner. Any time wheel slip occurs the retarder control system 17 successively reduces the resistance level at which the drivetrain retarder 12 is operated until wheel slip of the driven wheels ceases. It will of course be understood that, when the drivetrain retarder 12 is operated at its lowest non-zero resistance level a change of the operational state of the drivetrain retarder 12 from on to off is equivalent to stepping the resistance level at which the drivetrain retarder 12 is operated down to the next lowest resistance level. Any time the drivetrain retarder 12 is operated at a traction limited resistance level that is lower than the selected resistance level for a predetermined period of time without wheel slip occurring the retarder control system 17 increases the resistance level to the next highest resistance level at which the drivetrain retarder 12 may be operated.

Figure 14A:
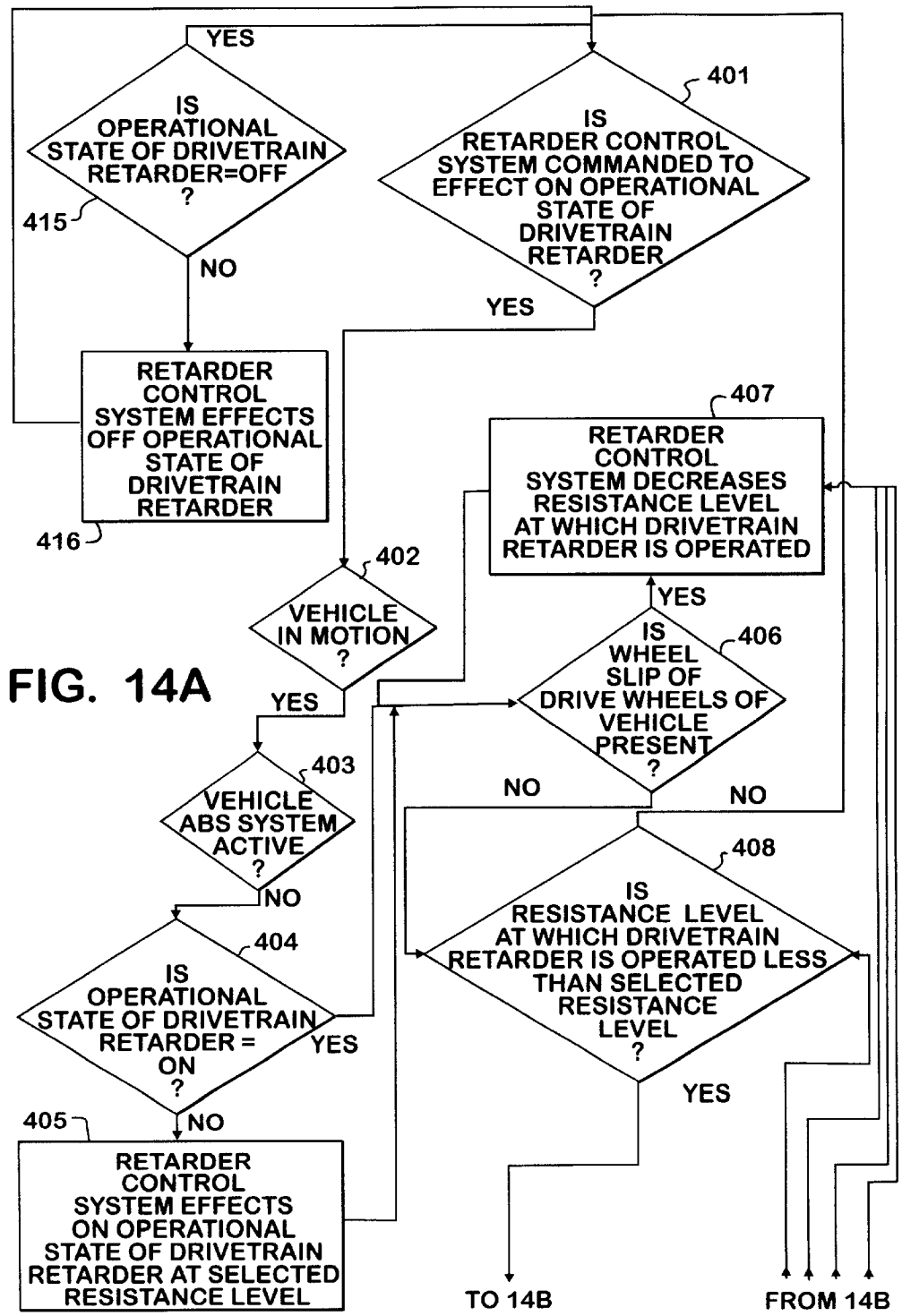
FIG. 14 is a flow chart outlining the process of one embodiment of the traction controlled method of operation of a retarder control system according to the present invention.
Figure 14B:
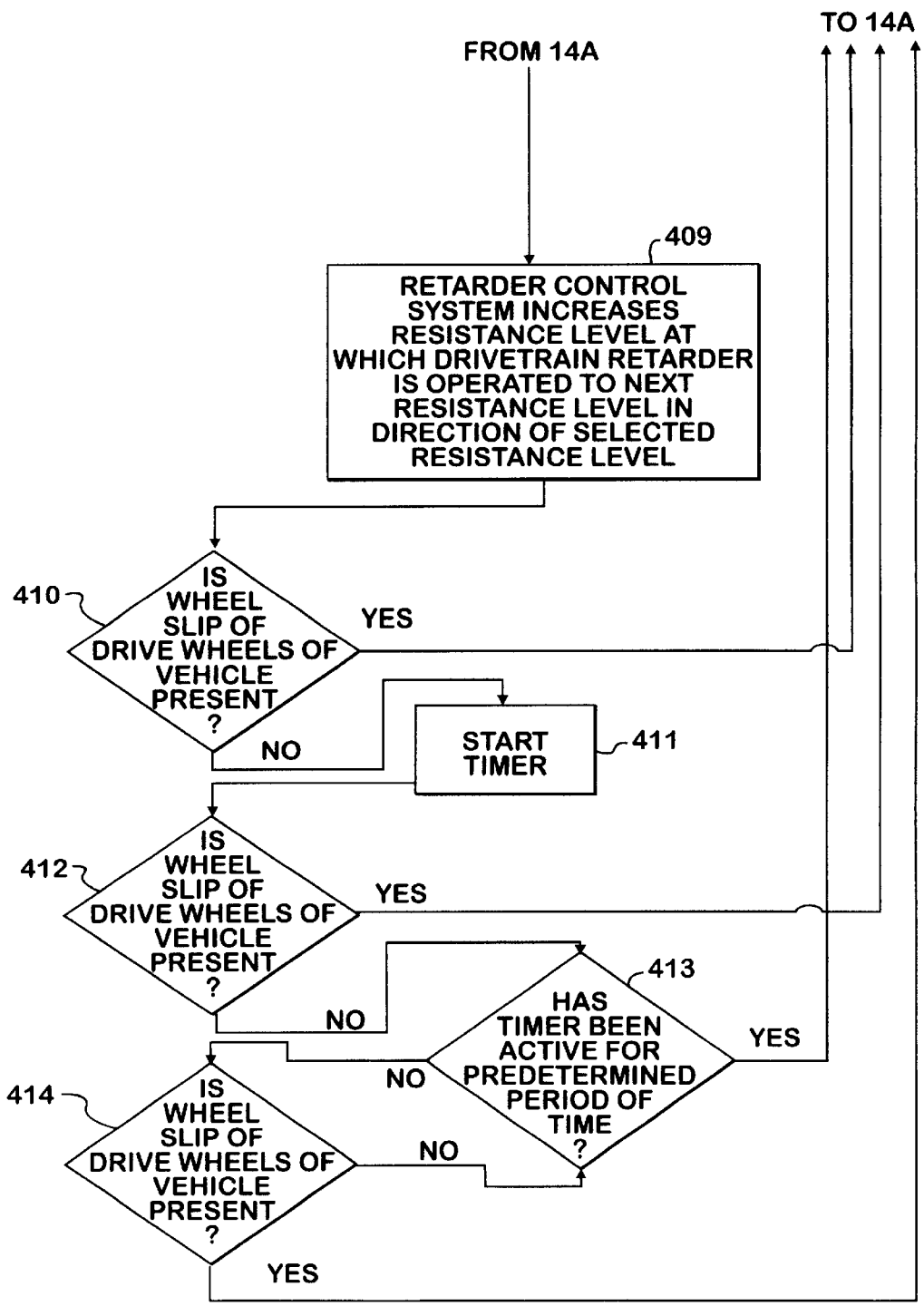

The general principles of the traction controlled method of operation of a retarder control system 17 according to the present invention can be further better understood by referencing FIGS. 12 and 14, which are flow charts each of which outlines a process of one embodiment of a method of operation of a retarder control system 17. The flow chart of FIG. 14 outlines a control algorithm for operating a retarder control system 17 according to one embodiment of a traction controlled method of operation according to the present invention. The flow chart of FIG. 12 outlines a control algorithm that includes both traction controlled and progressive transition methods of operating a retarder control system 17 according to the present invention. FIGS. 12 and 14 apply to vehicles that have an ABS type friction braking system. The traction controlled method of FIGS. 12 and 14 are also applicable only to retarder control systems 17 and vehicles 10 configured in such a manner that the retarder control system 17 is apprised of whether or not the vehicle 10 is in motion and whether or not the ABS system is active (modulating the braking effort of the friction brake system to prevent wheel slip). Additionally, as with all methods of operation of a retarder control system 17 according to the present invention, the traction controlled methods of FIGS. 12 and 14 apply only to vehicles 10 that have a drivetrain retarders 12 with multiple discrete resistance levels at which it can be operated. Of course it will be understood that a drivetrain retarder 12 that can be operated within a continuous range of resistance levels between a low resistance level and a high resistance level is considered to be operable at an infinite number of discrete resistance levels between the low resistance level and the high resistance level. The traction controlled method of operation of a retarder control system 17 defined by the flow charts of FIGS. 12 and 14 also applies only to vehicles 10 and retarder control systems 17 thereof wherein means exist for the retarder control system 17 to be apprised of whether or not wheel slip of the drive wheels of the vehicle 10 is occurring. The traction controlled methods of FIGS. 12 and 14 also apply to a vehicle 10 with a retarder control system 17 configured in such a manner that the retarder control system 17 is apprised of a selected resistance level of the drivetrain retarder 12. As can be easily ascertained by studying FIGS. 12 and 14 the selected resistance level is not necessarily the same as the resistance level at which the drivetrain retarder 12 is operated at any given time. The selected resistance level is a resistance level at which the drivetrain retarder 12 would be operated absent a contrary decision by the retarder control system 17 as a result of the logic of one or more of the novel methods of operation of the retarder control system 17 of the present invention, which methods according to the present invention are a subset of a comprehensive method of operation of the retarder control system 17. As is mentioned elsewhere in this disclosure the selected resistance level of the drivetrain retarder 12 may be determined automatically by portions of the control algorithm for the retarder control system 17 other than portions of the control algorithm comprised by the present invention. In the case of most vehicles 10, retarder control systems 17, and methods of operation thereof according to the present invention, the selected resistance level will simply be set by a retarder resistance selector 19 that is manually operated by a driver of the vehicle 10. In a similar manner, the algorithm according to which the retarder control system 17 operates may automatically determine the commanded operational state of the drivetrain retarder 12. In the case of most of the vehicles 10, retarder control systems 17, and methods of operation thereof according to the present invention, the commanded operational state of the drivetrain retarder 12 will be determined by the operational state of a retarder state selector 18 that is manually operated by a driver of the vehicle 10. As can be seen in FIGS. 11, 12, 13, and 14 the methods of operation of the retarder control system 17 according to the present invention may cause the retarder control system 17 to override the commanded operational state of the drivetrain retarder 12 when the commanded operational state is on and the vehicle 10 is not in motion or the ABS system of the vehicle 10 is active.

For exemplary purposes, the process of the traction controlled method of FIG. 14 will be discussed now. The traction controlled method of FIG. 14 starts at 401 where the retarder control system 17 ascertains whether or not it is being commanded to effect an operational state of on for the drivetrain retarder 12. If the retarder control system 17 is being commanded at 401 to effect an on operational state of the drivetrain retarder 12, a determination is made at 402 if the vehicle 10 is in motion. If the vehicle 10 is in motion, a determination is made at 403 if the vehicle ABS system is active. If the vehicle ABS system is not active a determination is made at 404 whether or not the actual operational state of the drivetrain retarder 12 is on. If at 404 it is determined that the actual operational state of the drivetrain retarder 12 is on, then it is determined at 406 if wheel slip of the drive wheels of the vehicle 10 is occuring. If it is determined at 406 that wheel slip of the drive wheels of the vehicle 10 is occurring, at 407 the retarder control system 17 decreases the resistance level at which the drivetrain retarder 12 is operated to the next lower resistance level at which the drivetrain retarder 12 can be operated. Once it is determined at 406 that wheel slip of the drive wheels of the vehicle 10 is not occurring a determination is made at 408 if the resistance level at which the drivetrain retarder 12 is operated is less than the selected resistance level of the drivetrain retarder 12. The resistance level at which the drivetrain retarder 12 is operated may not be equal to the selected resistance level of the drivetrain retarder 12 because the retarder control system 17 has effected operation of the drivetrain retarder 12 at a traction limited resistance level in order to prevent wheel slip of the drive wheels of the vehicle 10. If it is determined at 408 the resistance level at which the drivetrain retarder 12 is operated is not less than the selected resistance level, execution of the control algorithm of FIG. 14 begins anew at 401. Alternatively, if it is determined at 408 the resistance level at which the drivetrain retarder 12 is operating is less than the selected resistance level, at 409 the retarder control system 17 increases the resistance level at which the drivetrain retarder 12 is operated to the next resistance level in the direction of the selected resistance level. Subsequent to the retarder control system 17 adjusting the resistance level at which the drivetrain retarder 12 is operated at 409, it is determined once again at 410 if wheel slip of the drive wheels of the vehicle 10 is occurring. If at 410 it is determined that wheel slip of the drive wheels of the vehicle 10 is occurring, execution of the control algorithm returns to 407 where the resistance level at which the drivetrain retarder 12 is operated is reduced to the next lower resistance level. If, alternatively, at 410 it is determined that wheel slip of the drive wheels of the vehicle 10 is not occurring, a timer is started at 412. After the timer is started at 412, at 413 it is once again determined if wheel slip of the drive wheels of the vehicle 10 is occurring. If at 413 it is determined that wheel slip of the drive wheels of the vehicle 10 is occurring execution of the control algorithm returns to 407 where the resistance level at which the drivetrain retarder 12 is operated is reduced to the next lower resistance level. If, alternatively, at 413 it is determined that wheel slip of the drive wheels of the vehicle 10 is not occurring, it is determined at 414 if the timer has been activated for a predetermined period of time for which it is desired to delay between increasing the resistance level at which the drivetrain retarder 12 is operated when stepping the resistance level at which the drivetrain retarder 12 is operated toward the selected resistance level. Once control of the retarder control system 17 reaches block 414, the retarder control system 17 cycles through block 414 and 415 repeatedly until it is either determined at 415 that wheel slip of the drive wheels of the vehicle 10 is occurring or it is determined at 414 that the timer has been activated for the predetermined period of time. If it is determined at 415 that wheel slip of the drive wheels of the vehicle 10 is occurring, control of the retarder control system 17 returns to block 407 where the retarder control system 17 reduces the resistance level at which the drivetrain retarder 12 is operated to the next lower resistance level. If it is determined at 414 that the timer has been activated for the predetermined period of time, control of the retarder control system 17 returns to block 408 where it is determined if the resistance level at which the drivetrain retarder 12 is operated is equal to the selected resistance level.

The control algorithm of the flow chart of FIG. 14 further includes provisions for operating the retarder control system 17 according to the traction controlled and progressive transition methods of operation when the retarder control system 17 is commanded to effect an on operational state of the drivetrain retarder 12 subsequent to having been commanded to effect an off operational state of the drivetrain retarder 12. If, as would occur under such circumstances, it is determined at block 404 that the actual operational state of the drivetrain retarder 12 is off, at 405 the retarder control system 17 would effect an on operational state of the drivetrain retarder 12 at the selected resistance level. Subsequently execution of the control algorithm would proceed to block 406 and would proceed from there in the same manner as described above.

The control algorithm defined by the flow chart of FIG. 14 also includes provisions for appropriate operation of the retarder control system 17 in the event that the vehicle 10 is not in motion or that the ABS system of the vehicle 10 is operational. It can be seen in FIG. 14 that, if at 402 it is determined that the vehicle 10 is not in motion, the retarder control system 17 cause the operational state of the drivetrain retarder 12 to become off at either 416. Operation of the retarder control system 17 in such a manner is desirable because operation of the drivetrain retarder 12 in its on operational state while the vehicle 10 is not in motion serves no purpose. Similarly, if it is determined at 403 that the ABS system of the vehicle 10 is active, the retarder control system 17 causes the operational state of the drivetrain retarder 12 to become off at 416. Operation of the retarder control system 17 in such a manner is desirable because operation of the drivetrain retarder 12 in its on operational state while the ABS system of the vehicle 10 makes it highly challenging for the ABS system to properly control actuation of the vehicle's 10 friction brakes 24.

It will, of course, be understood that the control algorithm defined by the flow chart of FIG. 14 is only one specific example of many possible embodiments of a control algorithm for effecting operation of a retarder control system 17 according to the traction controlled method of operation according to the present invention. A control algorithm for effecting the traction controlled method of operation according to the present invention may comprise less elements or more elements than the example set forth in FIG. 14. For example such a control algorithm need not include elements such as 402 and 403, which check for motion of the vehicle 10 and ABS system activity. Alternatively, such a control algorithm may contain more points at which the retarder control system 17 checks for motion of the vehicle 10 and/or ABS system activity. In fact a retarder control system 17 may be operated according to an embodiment of the progressive transition method in which the ABS system is constantly monitored for activity and any time that ABS system is activity is detected the retarder control system 17 causes the operational state of the drivetrain retarder 12 to become off. Some embodiments of the progressive transition method of control of a retarder control system 17 may be used with vehicles 10 that do not have ABS systems and, may therefore, not include any logic dependent upon ABS system activity. Additionally a control algorithm for a traction controlled method of operation according to the present invention may have more points at which it is determined if wheel slip of the drive wheels of the vehicle 10 is occurring. In fact such a control algorithm and a vehicle 10 which includes a retarder control system 17 operating according thereto may be configured in such a manner that operating parameters are constantly monitored in order to detect wheel slip of the drive wheels of the vehicle 10 and any time wheel slip of the drive wheels is detected the retarder control system 17 enters some embodiment of a traction controlled method of operation according to the present invention. The defining characteristic of a control algorithm according to the traction controlled method of the present invention is the inclusion of one or more points at which a determination is made as to whether or not wheel slip of the drive wheels of the vehicle 10 is occurring such as at 406, 410, 412, and 414 of FIG. 14 and, a step of reducing the resistance level at which the drivetrain retarder 12 is operated such as at 407 of FIG. 14, when wheel slip of the drive wheels of the vehicle 10 is detected. It will of course, also be understood that a control algorithm, including the one exemplified by the flow chart of FIG. 14, for effecting operation of a retarder control system 17 according to a traction controlled method of operation may be executed simultaneous to other control algorithms which are subsets of the entire control algorithm for the retarder control system 17.

For exemplary purposes, the process of the combined traction controlled/progressive transition method of FIG. 12 will be discussed now. The traction controlled/progressive transition method of FIG. 12 starts at 201 where the retarder control system 17 ascertains whether or not it is being commanded to effect an operational state of on for the drivetrain retarder 12. If the retarder control system 17 is being commanded at 201 to effect an on operational state of the drivetrain retarder 12, a determination is made at 202 if the vehicle 10 is in motion. If the vehicle 10 is in motion, a determination is made at 203 if the vehicle ABS system is active. If the vehicle ABS system is not active a determination is made at 204 whether or not the actual operational state of the drivetrain retarder 12 is on. If at 204 it is determined that the actual operational state of the drivetrain retarder 12 is on, then it is determined at 206 if wheel slip of the drive wheels of the vehicle 10 is occuring. If it is determined at 206 that wheel slip of the drive wheels of the vehicle 10 is occurring, at 207 the retarder control system 17 decreases the resistance level at which the drivetrain retarder 12 is operated to the next lower resistance level at which the drivetrain retarder 12 can be operated. Once it is determined at 206 that wheel slip of the drive wheels of the vehicle 10 is not occurring a determination is made at 208 if the resistance level at which the drivetrain retarder 12 is operated is equal to the selected resistance level of the drivetrain retarder 12. The resistance level at which the drivetrain retarder 12 is operated may not be equal to the selected resistance level of the drivetrain retarder 12 either because the selected resistance level of the drivetrain retarder 12 has been recently changed or because the retarder control system 17 has effected operation of the drivetrain retarder 12 at a traction limited resistance level in order to prevent wheel slip of the drive wheels of the vehicle 10. If it is determined at 208 that the drivetrain retarder 12 is operating at the selected resistance level of the drivetrain retarder 12 execution of the control algorithm of FIG. 12 begins anew at 201. Alternatively, if it is determined at 208 that the drivetrain retarder 12 is not operating at the selected resistance level, at 209 the retarder control system 17 increases or decreases the resistance level at which the drivetrain retarder 12 is operated to the next resistance level in the direction of the selected resistance level. In other words, if at 208 the drivetrain retarder 12 is operated at a resistance level greater than the selected resistance level at 209 the retarder control system 17 reduces the resistance level at which the drivetrain retarder 12 is operated to the next lower resistance level and, if at 208 the drivetrain retarder 12 is operated at a resistance level that is less than the selected resistance level, at 209 the retarder control system 17 increases the resistance level at which the drivetrain retarder 12 is operated to the next higher resistance level. Subsequent to the retarder control system 17 adjusting the resistance level at which the drivetrain retarder 12 is operated at 209, it is determined once again at 210 if wheel slip of the drive wheels of the vehicle 10 is occurring. If at 210 it is determined that wheel slip of the drive wheels of the vehicle 10 is occurring, execution of the control algorithm returns to 207 where the resistance level at which the drivetrain retarder 12 is operated is reduced to the next lower resistance level. If, alternatively, at 210 it is determined that wheel slip of the drive wheels of the vehicle 10 is not occurring, a timer is started at 212. After the timer is started at 212, at 213 it is once again determined if wheel slip of the drive wheels of the vehicle 10 is occurring. If at 213 it is determined that wheel slip of the drive wheels of the vehicle 10 is occurring execution of the control algorithm returns to 207 where the resistance level at which the drivetrain retarder 12 is operated is reduced to the next lower resistance level. If, alternatively, at 213 it is determined that wheel slip of the drive wheels of the vehicle 10 is not occurring, it is determined at 214 if the timer has been activated for a predetermined period of time for which it is desired to delay between increasing or decreasing the resistance level at which the drivetrain retarder 12 is operated when stepping the resistance level at which the drivetrain retarder 12 is operated toward the selected resistance level. Once control of the retarder control system 17 reaches block 214, the retarder control system 17 cycles through block 214 and 215 repeatedly until it is either determined at 215 that wheel slip of the drive wheels of the vehicle 10 is occurring or it is determined at 214 that the timer has been activated for the predetermined period of time. If it is determined at 215 that wheel slip of the drive wheels of the vehicle 10 is occurring, control of the retarder control system 17 returns to block 207 where the retarder control system 17 reduces the resistance level at which the drivetrain retarder 12 is operated to the next lower resistance level. If it is determined at 214 that the timer has been activated for the predetermined period of time, control of the retarder control system 17 returns to block 208 where it is determined if the resistance level at which the drivetrain retarder 12 is operated is equal to the selected resistance level.

The control algorithm of the flow chart of FIG. 12 further includes provisions for operating the retarder control system 17 according to the traction controlled and progressive transition methods of operation when the retarder control system 17 is commanded to effect an on operational state of the drivetrain retarder 12 subsequent to having been commanded to effect an off operational state of the drivetrain retarder 12. If, as would occur under such circumstances, it is determined at block 204 that the actual operational state of the drivetrain retarder 12 is off, at 216 the retarder control system 17 would effect an on operational state of the drivetrain retarder 12 and operation of the drivetrain retarder 12 at the lowest non-zero resistance level at which it can be operated. Subsequently, at 217 it would be determined if wheel slip of the drive wheels of the vehicle 10 were occurring. If at 217 it is determined that wheel slip of the drive wheels of the vehicle 10 is not occurring, control of the retarder control system 17 proceeds to block 208 and proceeds thereafter in accordance with the steps that follow block 208 as is described in greater detail above. If it is determined at 208 that wheel slip of the drive wheels of the vehicle 10 is occurring, at 225 the retarder control system 17 effects an off operational state of the drivetrain retarder 12, after which the control algorithm of FIG. 12 begins anew at block 201.

The control algorithm outlined by the flow chart of FIG. 12 also contains provisions for operating the retarder control system 17 in accordance with the traction controlled and progressive transition methods of operation when the retarder control system 17 is commanded to effect an off operational state of the drivetrain retarder 12 after having been commanded to effect an on operational state of the drivetrain retarder 12. Under such circumstances it would be determined at 201 that the retarder control system 17 is commanded to effect an off operational state of the drivetrain retarder 12 and it would be determined at 218 that the actual operational state of the drivetrain retarder 12 is on. In such a case, when it is determined at 218 that the actual operational state of the drivetrain retarder 12 is off a determination is made at 219 if the vehicle 10 is in motion. If at 219 it is determined that the vehicle 10 is in motion, a determination is made at 220 if the vehicle ABS system is active. If it is determined at 220 that the vehicle ABS system is not active, a determination is made at 221 if wheel slip of the drive wheels of the vehicle 10 is present. If it is determined at 221 that wheel slip of the drive wheels of the vehicle 10 is present, at 223 the retarder control system 17 reduces the resistance level at which the drivetrain retarder 12 is operated to the next lower level at which the drivetrain retarder 12 can be operated. Subsequently, a determination is made at 224 if wheel slip of the drive wheels of the vehicle 10 is occurring. If it is determined at 204 that wheel slip of the drive wheels of the vehicle 10 is occurring, at 223 the retarder control system 17 once again reduces the resistance level at which the drivetrain retarder 12 is operated to the next lower resistance level at which the drivetrain retarder 12 can be operated. If at 221 it is determined that wheel slip of the drive wheels of the vehicle 10 is not present, the retarder control system begins stepping down the resistance level at which the drivetrain retarder 12 is operated at 222 according to the progressive transition method according to the present invention. At 222 a determination is made as to whether the resistance level at which the drivetrain retarder 12 is operated is the lowest non-zero resistance level at which the drivetrain retarder 12 can be operated. If, at 222 it is determined that the drivetrain retarder 12 is operating at the lowest non-zero resistance level, the retarder control system 17 effects the off operational state of the drivetrain retarder 12 at 228. If it is determined at 222 that the drivetrain retarder 12 is operating at a resistance level greater than the lowest non-zero resistance level, at 223 the retarder control system 17 reduces the resistance level at which the drivetrain retarder 12 is operated to the next lower resistance level at which the drivetrain retarder 12 can be operated. After the retarder control system 17 reduces the resistance level at which the drivetrain retarder 12 is operated at 223, a determination is made at 224 if wheel slip of the drive wheels of the vehicle is occurring. If it is determined at 224 that wheel slip of the drive wheels of the vehicle 10 is not occurring, a timer is started at 225. After the timer is started at 225 a determination is made at 226 as to whether or not the timer has been active for a predetermined period of time for which it is desirable to pause at each resistance level while stepping the operation of the drivetrain retarder 12 down through successive resistance levels according to the progressive transition method of the present invention. At this point in the control algorithm the retarder control system 17 executes a wait loop at 226 until the timer has been activated for the predetermined period of time. Once it has been determined at 226 that the timer has been activated for the predetermined period of time the retarder control system 17 returns to 221 where a determination is made if wheel slip of the drive wheels of the vehicle 10 is present.

The control algorithm defined by the flow chart of FIG. 12 also includes provisions for appropriate operation of the retarder control system 17 in the event that the vehicle 10 is not in motion or that the ABS system of the vehicle 10 is operational. It can be seen in FIG. 12 that, if at 202 or 219 it is determined that the vehicle 10 is not in motion the retarder control system 17 cause the operational state of the drivetrain retarder 12 to become off at either 225 or 228. Operation of the retarder control system 17 in such a manner is desirable because operation of the drivetrain retarder 12 in its on operational state while the vehicle 10 is not in motion serves no purpose. Similarly, if it is determined at 203 or 220 that the ABS system of the vehicle 10 is active, the retarder control system 17 causes the operational state of the drivetrain retarder 12 to become off at 225 or 228. Operation of the retarder control system 17 in such a manner is desirable because operation of the drivetrain retarder 12 in its on operational state while the ABS system of the vehicle 10 makes it highly challenging for the ABS system to properly control actuation of the vehicle's 10 friction brakes 24.

It will, of course, be understood that the control algorithm defined by the flow chart of FIG. 12 is only one specific example of many possible embodiments of a control algorithm that includes both traction controlled and progressive transition methods of operation of a retarder control system 17 according to the present invention. A control algorithm that includes both traction controlled and progressive transition methods of operation of a retarder control system 17 according to the present invention may comprise less elements or more elements than the example set forth in FIG. 12. For example such a control algorithm need not include elements such as 202, 203, 219, and 220, which check for motion of the vehicle 10 and ABS system activity. Alternatively, such a control algorithm may contain more points at which the retarder control system 17 checks for motion of the vehicle 10 and/or ABS system activity. In fact a retarder control system 17 may be operated according to an embodiment of the progressive transition method in which the ABS system is constantly monitored for activity and any time that ABS system is activity is detected the retarder control system 17 causes the operational state of the drivetrain retarder 12 to become off. Some embodiments of the progressive transition method of control of a retarder control system 17 may be used with vehicles 10 that do not have ABS systems and, may therefore, not include any logic dependent upon ABS system activity. Additionally A control algorithm that includes both traction controlled and progressive transition methods of operation of a retarder control system 17 according to the present invention may have more points at which it is determined if wheel slip of the drive wheels of the vehicle 10 is occurring. In fact such a control algorithm and a vehicle 10 which includes a retarder control system 17 operating according thereto may be configured in such a manner that operating parameters are constantly monitored in order to detect wheel slip of the drive wheels of the vehicle 10 and any time wheel slip of the drive wheels is detected the retarder control system 17 enters some embodiment of a traction controlled method of operation according to the present invention.

A vehicle 10 according to the present invention may be of any of a number of well known and/or easily imaginable designs of a vehicle with a drivetrain retarder 12 and a retarder control system. In the preferred embodiment the vehicle 10 of the present invention comprises structural components 23 such as a frame ladder 26 to which a majority of other components of the vehicle 10 are directly or indirectly engaged and from which a majority of other components of the vehicle 10 derive support directly or indirectly. The vehicle 10 of the preferred embodiment also includes a suspension system 27 to which the frame ladder 26 is engaged and which supports the frame ladder 26 above the ground and provides the vehicle with a relatively low resistance to movement along the ground. The vehicle 10 of the preferred embodiment includes an occupant cabin 28 within which an operator of the vehicle 10 may reside while controlling the vehicle 10. The occupant cabin 28 is engaged to and supported by the frame ladder 26 of the vehicle 10. As was mentioned above, a vehicle 10 according to the present invention also includes a drivetrain 11 which is operable to motivate the vehicle 10 along the ground and which also includes a drivetrain retarder 12 operable to resist movement of the vehicle 10 along the ground.

As was mentioned, above a drivetrain retarder 12 of a vehicle 10 according to the present invention may be any of a number of different types of drivetrain retarders 12 including engine compression brakes, engine exhaust brakes, electric drive motors of electric or hybrid electric vehicles, and hydraulic pumps and other similar devices coupled to the drivetrain 11 of the vehicle. A drivetrain retarder 12 and a corresponding retarder control system 17 of a vehicle 10 according to the present invention must, however, be configured in such a manner that the retarder control system 17 may cause the drivetrain retarder 12 to operate at any one of a plurality of resistance levels. In the preferred embodiment of the present invention the drivetrain retarder 12 of the vehicle 10 is an engine compression brake with multiple discreet resistance levels at which it can be operated. Engine compression brakes with a finite number of resistance levels at which they can be operated are well known. Additionally it is anticipated that engine compression brakes with an infinite number of resistance levels at which they can be operated will be reduced to practice in the near future. It will of course be understood that the methods of the present invention could be readily applied, by one of ordinary skill in the art to engine compression brakes with an infinite number of resistance levels once such engine compression brakes are developed.

It is to be understood, also, that any elements of the progressive transition, the brake triggered activation, and/or the traction controlled methods of operation that are to be executed are to be executed automatically by the retarder control system 17 of the vehicle 10 when circumstances are appropriate for execution of the particular method. As a result a vehicle 10 according to the present invention and the retarder control system 17 thereof must be configured with any elements necessary to automatically effect proper execution of at least one of the progressive transition, the brake triggered activation, and/or the traction controlled methods of operation when circumstances are appropriate for such an execution of one of the methods. The elements of the retarder control system 17 necessary to automatically effect proper execution of one or more of the subsets of the method of operation of a retarder control system 17 according to the present invention include any sensors and/or switches necessary to ascertain the circumstances of operation of the vehicle 10 at any given time. The elements necessary for proper automatic execution of the method also include one or more logic devices for determining an appropriate operational state and resistance level of the drivetrain retarder 12 for a given set of circumstances, and means for communicating control commands to the drivetrain retarder 12 to effect the appropriate operational state and resistance level of the drivetrain retarder for the given set of circumstances. Each of the three subsets of the method of operation of a retarder control system 17 according to the present invention requires different sensors and/or switches as is outlined in greater detail above. The one or more logic devices of the retarder control system 17 may comprise any of a number of different combinations of switches, relays, timers, and/or microcomputers. According to the preferred embodiment of the invention, the retarder control system 17 comprises a microcomputer known as an Electrical System Controller (ESC) of the vehicle 10. In the preferred embodiment the ESC is communicatively connected to any of the sensors and/or switches necessary to ascertain those aspects of the circumstances of operation of the vehicle 10 that affect selection of an appropriate operational state and resistance level for the drivetrain retarder 12 according to the present invention. According to the preferred embodiment the ESC operates according to a computer program to automatically determine, in accordance with the algorithms of the method of operation of a retarder control system 17 according to the present invention among other subsets of the method for operation of the retarder control system 17, the appropriate operational state and resistance level for the drivetrain retarder under current circumstances. In the preferred embodiment the ESC communicates control commands, which include a commanded operational state and a commanded resistance level, to the drivetrain retarder 12 or a dedicated controller thereof over a J1939 serial data link. Additionally, in the preferred embodiment the ESC controls and monitors many other systems of the vehicle 10 and may alter control of those other systems of the vehicle 10 dependent upon the operational state of and the resistance level of the drivetrain retarder 12. Control of other systems of the vehicle 10 by the same logic device that controls the operation of the drivetrain retarder 12 is beneficial because it improves harmonization of the operation of the drivetrain retarder 12 and the other systems of the vehicle 10 and thus helps prevent damage to systems of the vehicle 10 as a result of undesirable combinations of operational states of the systems of the vehicle 10.

As was alluded to above in descriptions related to the preferred embodiments of the novel subsets of the method of operation of a retarder control system 17, there are circumstances in which it is undesirable for a retarder control system 17 operating according to any combination of the subsets of the method of operation to effect an on operational state of the drivetrain retarder 12 controlled thereby. In the case of most vehicles 10 it is undesirable to activate a drivetrain retarder 12 if the vehicle 10 is not in motion. A vehicle according to the preferred embodiment of the invention has a friction braking system 24 of the anti-lock braking system type. As is well known, such anti-lock braking systems modulate the braking force applied to various wheels 25 of the vehicle 10, when the anti-lock braking system is active. Anti-lock braking systems modulate the braking force applied to various wheels 25 of a vehicle 10 in an attempt to prevent wheel slip in a braking event. Proper execution of a method according to which an anti-lock braking system modulates braking force at various wheels 25 of a vehicle 10 in response to sensed wheel slip would be more difficult if a drivetrain retarder 12 were active when the anti-lock braking system were modulating braking forces to the wheels 25. For these reasons, each of the novel subsets of the method of operation of a retarder control system 17 according to the present invention includes the retarder control system 17 effecting an off operational state of the drivetrain retarder 12 controlled thereby, any time the anti-lock braking system of the vehicle 10 is modulating the braking force applied to the wheels 25 of the vehicle 10.

It will be understood by those skilled in the art that in some instances some features of the invention will be employed without a corresponding use of other features. It will also be understood by those skilled in the art that modifications could be made to the invention as described without departing from the spirit and scope of the invention and thus the scope of the invention is limited only by the following claims.

We claim:

1. A method of operating a retarder control system that controls operation of a drivetrain retarder of a vehicle, said method comprising the steps of:

(a) the retarder control system controlling a resistance level and an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a change in a selected resistance level at which the retarder control system is commanded to effect operation of the drivetrain retarder;

(b) said method of operating a retarder control system comprises a progressive transition method which comprises the steps of:

the retarder control system causing the resistance level, at which the drivetrain retarder is operated, to automatically step operation of the drivetrain retarder through one or more intermediate resistance levels when transitioning a resistance level at which the drivetrain retarder is operated from a starting resistance level to an ending resistance level between which said intermediate resistance levels are present;

whenever the retarder control system is in a progressive transition mode of operation, every time the drivetrain retarder is activated to an ending resistance level between which and a starting resistance level there are intermediate resistance levels, the retarder control system automatically transitioning the resistance level at which the drivetrain retarder is operated through one or more of said intermediate resistance levels;

whenever the retarder control system is in a progressive transition mode of operation, every time the drivetrain retarder is deactivated from operation at a starting resistance level between which and an ending resistance level there are one or more intermediate resistance levels, the retarder control system automatically transitioning the resistance level at which the drivetrain retarder is operated through one or more of said intermediate resistance levels;

whenever the retarder control system is in a progressive transition mode of operation, every time the drivetrain retarder is transitioned from operation at a starting resistance level between which and an ending resistance level there are one or more intermediate resistance levels, the retarder control system automatically transitioning the resistance level at which the drivetrain retarder is operated through one or more of said intermediate resistance levels; and whenever the retarder control system is in a progressive transition mode of operation, every time the drivetrain retarder is transitioned from operation at a starting resistance level between which and an ending resistance level there are one or more intermediate resistance levels, the retarder control system automatically transitioning the resistance level at which the drivetrain retarder is operated through each of said intermediate resistance levels;

(c) said method of operation further comprises a traction controlled method of operation of said retarder control system, said traction controlled method of operation of said retarder control system comprising the steps of:

when the drivetrain retarder has an operational state of on and the microcomputer detects wheel slip of the drive wheels of the vehicle, the retarder control system reducing the resistance level at which the drivetrain retarder is operated or effecting an off operational state of the drivetrain retarder; and (d) said traction controlled method of operation more specifically comprises the steps of:

when the drivetrain retarder has an operational state of on, the ABS braking system of the vehicle is not active, and the microcomputer of the vehicle determines that wheel slip of the drive wheels of the vehicle is occurring the retarder control system finding a traction limited resistance level of the drivetrain retarder by successively reducing the resistance level at which the drivetrain retarder is operated until the microcomputer of the vehicle determines that wheel slip of the drive wheels of the vehicle has ceased;

the retarder control system causing the drivetrain retarder to operate at said traction limited resistance level for a predetermined period of time or until wheel slip of the drive wheels occurs;

any time the drivetrain retarder is operated at a traction limited resistance level for said predetermined period of time without wheel slip of the drive wheels of the vehicle occuring, the retarder control system incrementing the resistance level at which the drivetrain retarder is operated up to a next highest resistance level at which the drivetrain retarder can be operated; and any time the drivetrain retarder is operated at a traction limited resistance level and wheel slip of the drive wheels of the vehicle occurs, the retarder control system reducing the resistance level at which the drivetrain retarder is operated until wheel slip of the drive wheels of the vehicle ceases.

2. A method of operating a retarder control system that controls operation of a drivetrain retarder of a vehicle, said method comprising the steps of:

(a) the retarder control system controlling a resistance level and an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a change in a selected resistance level at which the retarder control system is commanded to effect operation of the drivetrain retarder;

(b) said method of operation further comprises a traction controlled method of operation of said retarder control system, said traction controlled method of operation of said retarder control system comprising the steps of:

when the drivetrain retarder has an operational state of on and the microcomputer detects wheel slip of the drive wheels of the vehicle, the retarder control system reducing the resistance level at which the drivetrain retarder is operated or effecting an off operational state of the drivetrain retarder; and (c) said traction controlled method of operation more specifically comprises the steps of:

when the drivetrain retarder has an operational state of on, the ABS braking system of the vehicle is not active, and the microcomputer of the vehicle determines that wheel slip of the drive wheels of the vehicle is occurring the retarder control system finding a traction limited resistance level of the drivetrain retarder by successively reducing the resistance level at which the drivetrain retarder is operated until the microcomputer of the vehicle determines that wheel slip of the drive wheels of the vehicle has ceased;

the retarder control system causing the drivetrain retarder to operate at said traction limited resistance level for a predetermined period of time or until wheel slip of the drive wheels occurs;

any time the drivetrain retarder is operated at a traction limited resistance level for said predetermined period of time without wheel slip of the drive wheels of the vehicle occuring, the retarder control system incrementing the resistance level at which the drivetrain retarder is operated up to a next highest resistance level at which the drivetrain retarder can be operated; and any time the drivetrain retarder is operated at a traction limited resistance level and wheel slip of the drive wheels of the vehicle occurs, the retarder control system reducing the resistance level at which the drivetrain retarder is operated until wheel slip of the drive wheels of the vehicle ceases.

3. A method of operating a retarder control system that controls operation of a drivetrain retarder of a vehicle, the vehicle having a friction braking system with a brake control member and which vehicle comprises a switch or sensor, to which the retarder control system is communicatively linked, and which provides signals to the retarder control system that the retarder control system can interpret to determine a magnitude of a displacement of the brake control member from its home position when the brake control member is displaced from its home position to a brake trigger position, wherein said method comprising the steps of:

(a) the retarder control system controlling a resistance level and an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a chance in a selected resistance level at which the retarder control system is commanded to effect operation of the drivetrain retarder;

(b) said method of operating the retarder control system comprises a brake triggered activation method which comprises the steps of:

when the vehicle is in motion and the brake control member is displaced from its home position and is in a brake trigger position, the retarder control system effecting an on operational state of the drivetrain retarder of the vehicle;

(a) said step of the retarder controller effecting an on operational state of the drivetrain retarder when the vehicle is in motion and the brake control member is displaced from its home position and is in a brake trigger position more specifically comprises the retarder control system effecting operation of the drivetrain retarder at a resistance level that is proportional to the displacement of the brake control member from its home position.

4. The method of operation of a retarder control system of claim 3 in a vehicle that further includes an ABS system, wherein:

(a) said step of the retarder control system effecting an operational state of on of the drivetrain retarder at a resistance level proportional to the displacement of the brake control member from its home position is triggered by displacement of said brake control member from its home position only when said vehicle is in motion and said braking ABS system of said vehicle is not active.

5. The method of operation of a retarder control system of claim 3 in a vehicle that further includes an ABS system, wherein:

(a) said step of the retarder control system effecting an operational state of on of the drivetrain retarder is triggered by displacement of said brake control member from its home position only when said vehicle is in motion and said braking ABS system of said vehicle is not active.

6. A computer program for controlling at least some operations of a retarder control system, which includes a microcomputer, of a vehicle, which comprises the retarder control system and a drivetrain retarder, which is controlled by the retarder control system, said computer program comprising:

(a) computer instructions embodied in computer readable medium for causing the microcomputer of the retarder control system and, thus, the retarder control system to perform the steps of:

the retarder control system controlling a resistance level or an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a change in a selected resistance level at which the retarder control system is commanded to effect operation of the drivetrain retarder;

the retarder control system causing the resistance level, at which the drivetrain retarder is operated, to automatically step operation of the drivetrain retarder through one or more intermediate resistance levels when transitioning a resistance level at which the drivetrain retarder is operated from a starting resistance level to an ending resistance level between which said intermediate resistance levels are present;

whenever the retarder control system is in a progressive transition mode of operation, every time the drivetrain retarder is activated to an ending resistance level between which and a starting resistance level there are intermediate resistance levels, the retarder control system automatically transitioning the resistance level at which the drivetrain retarder is operated through one or more of said intermediate resistance levels;

whenever the retarder control system is in a progressive transition mode of operation, every time the drivetrain retarder is deactivated from operation at a starting resistance level between which and an ending resistance level there are one or more intermediate resistance levels, the retarder control system automatically transitioning the resistance level at which the drivetrain retarder is operated through one or more of said intermediate resistance levels;

whenever the retarder control system is in a progressive transition mode of operation, every time the drivetrain retarder is transitioned from operation at a starting resistance level between which and an ending resistance level there are one or more intermediate resistance levels, the retarder control system automatically transitioning the resistance level at which the drivetrain retarder is operated through one or more of said intermediate resistance levels;

whenever the retarder control system is in a progressive transition mode of operation, every time the drivetrain retarder is transitioned from operation at a starting resistance level between which and an ending resistance level there are one or more intermediate resistance levels, the retarder control system automatically transitioning the resistance level at which the drivetrain retarder is operated through each of said intermediate resistance levels;

(b) said computer program is further configured to cause operation of the microcomputer of the retarder control system according to a traction controlled method of operation in addition to said progressive transition method of operation, said traction controlled method of operation of said retarder control system comprising the steps of:

when the drivetrain retarder has an operational state of on and the microcomputer detects wheel slip of the drive wheels of the vehicle, the retarder control system reducing the resistance level at which the drivetrain retarder is operated or effecting an off operational state of the drivetrain retarder;

(c) said computer program is more specifically configured such that said traction controlled method of operation more specifically comprises the steps of:

when the drivetrain retarder has an operational state of on, the ABS braking system of the vehicle is not active, and the microcomputer of the vehicle determines that wheel slip of the drive wheels of the vehicle is occurring the retarder control system finding a traction limited resistance level of the drivetrain retarder by successively reducing the resistance level at which the drivetrain retarder is operated until the microcomputer of the vehicle determines that wheel slip of the drive wheels of the vehicle has ceased;

the retarder control system causing the drivetrain retarder to operate at said traction limited resistance level for a predetermined period of time or until wheel slip of the drive wheels occurs;

any time the drivetrain retarder is operated at a traction limited resistance level for said predetermined period of time without wheel slip of the drive wheels of the vehicle occuring, the retarder control system incrementing the resistance level at which the drivetrain retarder is operated up to a next highest resistance level at which the drivetrain retarder can be operated; and any time the drivetrain retarder is operated at a traction limited resistance level and wheel slip of the drive wheels of the vehicle occurs, the retarder control system reducing the resistance level at which the drivetrain retarder is operated until wheel slip of the drive wheels of the vehicle ceases.

7. A computer program for controlling at least some operations of a retarder control system, which includes a microcomputer, of a vehicle, which comprises the retarder control system and a drivetrain retarder, which is controlled by the retarder control system, said computer program comprising:

(a) computer instructions embodied in computer readable medium for causing the microcomputer of the retarder control system and, thus, the retarder control system to perform the steps of:

the retarder control system controlling a resistance level or an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a change in a selected resistance level at which the retarder control system is commanded to effect operation of the drivetrain retarder;

(b) said computer program is further configured to cause operation of the microcomputer of the retarder control system according to a traction controlled method of operation in addition to said progressive transition method of operation, said traction controlled method of operation of said retarder control system comprising the steps of:

when the drivetrain retarder has an operational state of on and the microcomputer detects wheel slip of the drive wheels of the vehicle, the retarder control system reducing the resistance level at which the drivetrain retarder is operated or effecting an off operational state of the drivetrain retarder (c) said computer program is more specifically configured such that said traction controlled method of operation more specifically comprises the steps of:

when the drivetrain retarder has an operational state of on, the ABS braking system of the vehicle is not active, and the microcomputer of the vehicle determines that wheel slip of the drive wheels of the vehicle is occurring the retarder control system finding a traction limited resistance level of the drivetrain retarder by successively reducing the resistance level at which the drivetrain retarder is operated until the microcomputer of the vehicle determines that wheel slip of the drive wheels of the vehicle has ceased;

the retarder control system causing the drivetrain retarder to operate at said traction limited resistance level for a predetermined period of time or until wheel slip of the drive wheels occurs;

any time the drivetrain retarder is operated at a traction limited resistance level for said predetermined period of time without wheel slip of the drive wheels of the vehicle occuring, the retarder control system incrementing the resistance level at which the drivetrain retarder is operated up to a next highest resistance level at which the drivetrain retarder can be operated; and any time the drivetrain retarder is operated at a traction limited resistance level and wheel slip of the drive wheels of the vehicle occurs, the retarder control system reducing the resistance level at which the drivetrain retarder is operated until wheel slip of the drive wheels of the vehicle ceases.

8. A computer program for controlling at least some operations of a retarder control system, which includes a microcomputer, of a vehicle, which comprises the retarder control system and a drivetrain retarder, which is controlled by the retarder control system, the vehicle that includes a friction braking system with a brake control member and which vehicle comprises a switch or sensor, to which the retarder control system is communicatively linked, and which provides signals to the retarder control system that the retarder control system can interpret to determine a magnitude of a displacement of the brake control member from its home position when the brake control member is displaced from its home position to a brake trigger position, wherein said computer program comprising:

(a) computer instructions embodied in computer readable medium for causing the microcomputer of the retarder control system and, thus, the retarder control system to perform the steps of:

the retarder control system controlling a resistance level or an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a change in a selected resistance level at which the retarder control system is commanded to effect operation of the drivetrain retarder;

(b) said computer program is configured to cause the retarder control system to operate according to a brake triggered activation method which comprises the steps of:

when the vehicle is in motion and the brake control member is displaced from its home position and is in a brake trigger position, the retarder control system effecting an on operational state of the drivetrain retarder of the vehicle;

(c) said computer program is further configured such that said step of the retarder controller effecting an on operational state of the drivetrain retarder when the vehicle is in motion and the brake control member is displaced from its home position and is in a brake trigger position more specifically comprises the retarder control system effecting operation of the drivetrain retarder at a resistance level that is proportional to the displacement of the brake control member from its home position.

9. The computer program of claim 8 for a vehicle that further includes an ABS system, wherein:
(a) said computer program is further configured such that said step of the retarder control system effecting an operational state of on of the drivetrain retarder at a resistance level proportional to the displacement of the brake control member from its home position is only executed when the vehicle is in motion, the brake control member is displaced from its home position and is in a brake triggered position, and the ABS system of the vehicle is not active.

10. A computer program for controlling at least some operations of a retarder control system, which includes a microcomputer, of a vehicle, which comprises the retarder control system and a drivetrain retarder, which is controlled by the retarder control system, said computer program comprising:
(a) computer instructions embodied in computer readable medium for causing the microcomputer of the retarder control system and, thus, the retarder control system to perform the steps of:
the retarder control system controlling a resistance level or an operational state at which the drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time from a change in a selected resistance level at which the retarder control system is commanded to effect operation of the drivetrain retarder;
(b) said computer program is configured to cause the retarder control system to operate according to a brake triggered activation method which comprises the steps of:
(c) when the vehicle is in motion and the brake control member is displaced from its home position and is in a brake trigger position, the retarder control system effecting an on operational state of the drivetrain retarder of the vehicle;
(d) said computer program is further configured such that said step of the retarder control system effecting an operational state of on of the drivetrain retarder is only executed when the vehicle is in motion, the brake control member is displaced from its home position and is in a brake triggered position, and the ABS system of the vehicle is not active.

11. A vehicle, comprising:
(a) one or more frame structures to which a majority of other components of said vehicle are engaged directly or indirectly and from which a majority of other components of said vehicle derive support directly or indirectly;
(b) a suspension system to which said one or more frame structures of said vehicle are engaged and which supports said one or more frame structures in an elevated position above the ground and which provides said vehicle with relatively low resistance to movement along the ground;
(c) an occupant cabin which is engaged to and supported by said one or more frame structures of said vehicle;
(d) a drivetrain which is engaged to said one or more frame structures of said vehicle and which is operable to provide motivation of said vehicle alone the ground;
(e) a drivetrain retarder engaged to one or more of said frame structures of said vehicle and some part of said drivetrain of said vehicle, which drivetrain retarder is operable to resist movement of said vehicle along the ground;
(f) a retarder control system that controls whether said drivetrain retarder has an on operational state, in which it resists movement of said vehicle along the ground, or an off operational state, in which it presents little or no resistance to movement of said vehicle along the ground, and which drivetrain retarder controls a resistance level at which said drivetrain retarder is operated when it has an operational state of on;
(g) wherein said retarder control system is configured in such a manner that at least a portion of operation of said retarder control system comprises the steps of:
said retarder control system controlling said resistance level and said operational state at which said drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time that said drivetrain retarder has had an on operational state;
(h) said retarder control system is configured in such a manner that at least a portion of said operation of said retarder control system comprises a progressive transition method of operation that comprises the steps of:
said retarder control system causing said resistance level, at which said drivetrain retarder is operated, to automatically step operation of said drivetrain retarder through one or more intermediate resistance levels when transitioning a resistance level at which said drivetrain retarder is operated from a starting resistance level to an ending resistance level between which said intermediate resistance levels are present;
(i) said retarder control system is configured in such a manner that said progressive transition method according to which at least a portion of the operation of said retarder control system is executed more specifically comprises the steps of:
whenever said retarder control system is in a progressive transition mode of operation, every time said drivetrain retarder is activated to an ending resistance level between which and a starting resistance level there are intermediate resistance levels, said retarder control system automatically transitioning said resistance level at which said drivetrain retarder is operated through one or more of said intermediate resistance levels;
whenever the retarder control system is in a progressive transition mode of operation, every time said drivetrain retarder is transitioned from operation at a starting resistance level between which and an ending resistance level there are one or more intermediate resistance levels, said retarder control system automatically transitioning said resistance level at which said drivetrain retarder is operated through each of said intermediate resistance levels;
(j) said retarder control system is configured in such a manner that said progressive transition method according to which at least a portion of the operation of said retarder control system is executed further comprises the steps of:

whenever the retarder control system is in a progressive transition mode of operation, every time said drivetrain retarder is deactivated from operation at a starting resistance level between which and an ending resistance level there are one or more intermediate resistance levels, said retarder control system automatically transitioning said resistance level at which said drivetrain retarder is operated through one or more of said intermediate resistance levels;

(k) said retarder control system is configured in such a manner that said progressive transition method according to which at least a portion of the operation of said retarder control system is executed more specifically comprises the steps of:

whenever the retarder control system is in a progressive transition mode of operation, every time said drivetrain retarder is transitioned from operation at a starting resistance level between which and an ending resistance level there are one or more intermediate resistance levels, said retarder control system automatically transitioning said resistance level at which said drivetrain retarder is operated through one or more of said intermediate resistance levels;

(l) said retarder control system of said vehicle includes a microcomputer and means by which said microcomputer can detect wheel slip of drive wheels of said vehicle; and (m) said retarder control system is configured in such a manner that at least a portion of operation of said retarder control system is executed in accordance with a traction limited method of operation which comprises the steps of:

when said drivetrain retarder has an operational state of on and said microcomputer detects wheel slip of said drive wheels of said vehicle, said retarder control system reducing said resistance level at which said drivetrain retarder is operated or effecting an off operational state of said drivetrain retarder;

(n) said vehicle further comprises an ABS braking system;

(o) said vehicle, said retarder control system, and said ABS braking system are configured in such a manner that said microcomputer of said retarder control system is apprised of activity by said ABS braking system;

(p) said retarder control system is configured in such a manner that said traction limited method of operation according to which at least a portion of operation of said drivetrain retarder is executed, more specifically comprises the steps of:

when said drivetrain retarder has an operational state of on, said ABS braking system of said vehicle is not active, and said microcomputer of said retarder control system determines that wheel slip of said drive wheels of said vehicle is occurring said retarder control system finding a traction limited resistance level of said drivetrain retarder by successively reducing said resistance level at which said drivetrain retarder is operated until said microcomputer of said retarder control system determines that wheel slip of said drive wheels of said vehicle has ceased;

said retarder control system causing said drivetrain retarder to operate at said traction limited resistance level for a predetermined period of time or until wheel slip of said drive wheels occurs;

any time said drivetrain retarder is operated at a traction limited resistance level for said predetermined period of time without wheel slip of said drive wheels of said vehicle occuring, said retarder control system incrementing said resistance level at which said drivetrain retarder is operated up to a next highest resistance level at which said drivetrain retarder can be operated; and any time said drivetrain retarder is operated at a traction limited resistance level and wheel slip of said drive wheels of said vehicle occurs, said retarder control system reducing said resistance level at which said drivetrain retarder is operated until wheel slip of said drive wheels of said vehicle ceases.

12. The vehicle of claim 11, wherein:
(a) said drivetrain retarder is an engine compression brake.

13. The vehicle of claim 12, wherein:
(a) said means by which said microcomputer of said retarder control system can detect wheel slip of said drive wheels of said vehicle comprises wheel speed sensors of said ABS braking system communicatively linked either directly or indirectly to said microcomputer of said retarder control system.

14. The vehicle of claim 13, wherein:
(a) said retarder control system comprises a retarder state selector which can be used by an operator of said vehicle to command said retarder control system to effect an operational state of on of said drivetrain retarder and which can also be used by an operator of said vehicle to command said retarder control system to effect an operational state of off of said drivetrain retarder; and
(b) said retarder control system comprises a retarder resistance selector which can be used by an operator of said vehicle to communicate said selected resistance level to said retarder control system.

15. A vehicle, comprising:
(a) one or more frame structures to which a majority of other components of said vehicle are engaged directly or indirectly and from which a majority of other components of said vehicle derive support directly or indirectly;
(b) suspension system to which said one or more frame structures of said vehicle are engaged and which supports said one or more frame structures in an elevated position above the ground and which provides said vehicle with relatively low resistance to movement along the ground;
(c) an occupant cabin which is engaged to and supported by said one or more frame structures of said vehicle;
(d) a drivetrain which is engaged to said one or more frame structures of said vehicle and which is operable to provide motivation of said vehicle along the ground;
(e) a drivetrain retarder engaged to one or more of said frame structures of said vehicle and some part of said drivetrain of said vehicle, which drivetrain retarder is operable to resist movement of said vehicle along the ground;
(f) a retarder control system that controls whether said drivetrain retarder has an on operational state, in which it resists movement of said vehicle along the ground, or an off operational state, in which it presents little or no resistance to movement of said vehicle along the ground, and which drivetrain retarder controls a resistance level at which said drivetrain retarder is operated when it has an operational state of on;
(g) wherein said retarder control system is configured in such a manner that at least a portion of operation of said retarder control system comprises the steps of:

said retarder control system controlling said resistance level and said operational state at which said drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time that said drivetrain retarder has had an on operational state;

(h) said retarder control system of said vehicle includes a microcomputer and means by which said microcomputer can detect wheel slip of drive wheels of said vehicle; and (i) said retarder control system is configured in such a manner that at least a portion of operation of said retarder control system is executed in accordance with a traction limited method of operation which comprises the steps of:

when said drivetrain retarder has an operational state of on and said microcomputer detects wheel slip of said drive wheels of said vehicle, said retarder control system reducing said resistance level at which said drivetrain retarder is operated or effecting an off operational state of said drivetrain retarder;

(j) said vehicle further comprises an ABS braking system;

(k) said vehicle, said retarder control system, and said ABS braking system are configured in such a manner that said microcomputer of said retarder control system is apprised of activity by said ABS braking system;

(l) said retarder control system is configured in such a manner that said traction limited method of operation according to which at least a portion of operation of said drivetrain retarder is executed, more specifically comprises the steps of:

when said drivetrain retarder has an operational state of on, said ABS braking system of said vehicle is not active, and said microcomputer of said retarder control system determines that wheel slip of said drive wheels of said vehicle is occurring said retarder control system finding a traction limited resistance level of said drivetrain retarder by successively reducing said resistance level at which said drivetrain retarder is operated until said microcomputer of said retarder control system determines that wheel slip of said drive wheels of said vehicle has ceased;

said retarder control system causing said drivetrain retarder to operate at said traction limited resistance level for a predetermined period of time or until wheel slip of said drive wheels occurs;

any time said drivetrain retarder is operated at a traction limited resistance level for said predetermined period of time without wheel slip of said drive wheels of said vehicle occuring, said retarder control system incrementing said resistance level at which said drivetrain retarder is operated up to a next highest resistance level at which said drivetrain retarder can be operated; and any time said drivetrain retarder is operated at a traction limited resistance level and wheel slip of said drive wheels of said vehicle occurs, said retarder control system reducing said resistance level at which said drivetrain retarder is operated until wheel slip of said drive wheels of said vehicle ceases.

16. The vehicle of claim 15, wherein:
(a) said means by which said microcomputer of said retarder control system can detect wheel slip of said drive wheels of said vehicle comprises wheel speed sensors of said ABS braking system communicatively linked either directly or indirectly to said microcomputer of said retarder control system.

17. The vehicle of claim 16, wherein:
(a) said drivetrain retarder is an engine compression brake.

18. The vehicle of claim 17, wherein:
(a) said retarder control system comprises a retarder state selector which can be used by an operator of said vehicle to command said retarder control system to effect an operational state of on of said drivetrain retarder and which can also be used by an operator of said vehicle to command said retarder control system to effect an operational state of off of said drivetrain retarder; and
(b) said retarder control system comprises a retarder resistance selector which can be used by an operator of said vehicle to communicate said selected resistance level to said retarder control system.

19. The vehicle of claim 18, wherein:
(a) said microcomputer of said retarder control system is an Electronic System Controller (ESC) that performs all logic operations associated with causing said retarder control system to operate according to said traction controlled method;
(b) said ESC is communicatively linked to said retarder state selector and said retarder resistance selector such that said ESC is apprised of an operational state commanded by said retarder state selector and a resistance level selected by said retarder resistance selector;
(c) said ESC is communicatively linked to said wheel speed sensors of said ABS system of said vehicle such that said ESC may be apprised of wheel speeds of wheels of said vehicle so that said ESC may determine whether or not wheel slip of said drive wheels of said vehicle is occurring; and
(d) said ESC controls operation of said drivetrain retarder directly or indirectly by communicating commands over a J1939 serial data link to said drivetrain retarder.

20. The vehicle of claim 15, wherein:
(a) said retarder control system comprises a retarder state selector which can be used by an operator of said vehicle to command said retarder control system to effect an operational state of on of said drivetrain retarder and which can also be used by an operator of said vehicle to command said retarder control system to effect an operational state of off of said drivetrain retarder; and
(b) said retarder control system comprises a retarder resistance selector which can be used by an operator of said vehicle to communicate said selected resistance level to said retarder control system.

21. The vehicle of claim 20, wherein:
(a) said microcomputer of said retarder control system is an Electronic System Controller (ESC) that performs all logic operations associated with causing said retarder control system to operate according to said traction controlled method;
(b) said ESC is communicatively linked to said retarder state selector and said retarder resistance selector such that said ESC is apprised of an operational state commanded by said retarder state selector and a resistance level selected by said retarder resistance selector;
(c) said ESC is communicatively linked to said wheel speed sensors of said ABS system of said vehicle such that said ESC may be apprised of wheel speeds of wheels of said vehicle so that said ESC may determine whether or not wheel slip of said drive wheels of said vehicle is occurring; and (d) said ESC controls operation of said drivetrain retarder directly or indirectly by communicating commands over a J1939 serial data link to said drivetrain retarder.

22. The vehicle of claim 21, wherein:

(a) said ESC is communicatively linked to sensors and switches of systems of said vehicle other than said retarder control system and controls at least part of operations of said systems of said vehicle other than said retarder control system in addition to controlling operations of said retarder control system.

23. The vehicle of claim 15, wherein:

(a) said microcomputer of said retarder control system is communicatively linked to sensors and switches of systems of said vehicle other than those of said retarder control system and said microcomputer controls at least part of operations of said other systems of said vehicle in addition to controlling operations of said retarder control system of said vehicle.

24. The vehicle of claim 15, wherein:

(a) said drivetrain retarder is an engine compression brake.

25. A vehicle, comprising:

(a) one or more frame structures to which a majority of other components of said vehicle are engaged directly or indirectly and from which a majority of other components of said vehicle derive support directly or indirectly;

(b) a suspension system to which said one or more frame structures of said vehicle are engaged and which supports said one or more frame structures in an elevated position above the ground and which provides said vehicle with relatively low resistance to movement along the ground;

(c) an occupant cabin which is engaged to and supported by said one or more frame structures of said vehicle;

(d) a drivetrain which is engaged to said one or more frame structures of said vehicle and which is operable to provide motivation of said vehicle along the ground;

(e) a drivetrain retarder engaged to one or more of said frame structures of said vehicle and some part of said drivetrain of said vehicle, which drivetrain retarder is operable to resist movement of said vehicle along the ground;

(f) a retarder control system that controls whether said drivetrain retarder has an on operational state, in which it resists movement of said vehicle along the ground, or an off operational state, in which it presents little or no resistance to movement of said vehicle along the ground, and which drivetrain retarder controls a resistance level at which said drivetrain retarder is operated when it has an operational state of on;

(g) wherein said retarder control system is configured in such a manner that at least a portion of operation of said retarder control system comprises the steps of:

said retarder control system controlling said resistance level and said operational state at which said drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time that said drivetrain retarder has had an on operational state;

(h) in addition to said drivetrain retarder, said vehicle comprises friction brakes;

(i) said vehicle further comprises a brake control member that causes actuation of said friction brakes when said brake control member is displaced from its home position to a brake trigger position;

(j) said vehicle comprises a switch or sensor, to which said retarder control system is communicatively linked, and which provides signals to said retarder control system that are dependent upon whether or not said brake control member is disposed in its home position or displaced from its home position to a brake trigger position;

(k) said retarder control system is configured in such a manner that at least part of operations of said retarder control system are executed in accordance with a brake triggered activation method which comprises the steps of:

when said vehicle is in motion and said brake control member is displaced from its home position and is in a brake trigger position, said retarder control system effecting an on operational state of said drivetrain retarder of said vehicle;

(l) said vehicle comprises a switch or sensor, to which said retarder control system is communicatively linked, and which provides signals to said retarder control system that said retarder control system can interpret to determine a magnitude of a displacement of said brake control member from its home position when said brake control member is displaced from its home position to a brake trigger position; and (m) said retarder control system is more specifically configured in such a manner that said step of said retarder controller effecting an on operational state of said drivetrain retarder when said vehicle is in motion and said brake control member is displaced from its home position and is in a brake trigger position more specifically comprises said retarder control system effecting operation of said drivetrain retarder at a resistance level that is proportional to said displacement of said brake control member from its home position.

26. The vehicle of claim 25, wherein:

(a) said friction brakes of said vehicle comprises an ABS braking system for modulating braking effort of said friction brakes to prevent wheel slip of wheels of said suspension system of said vehicle;

(b) said retarder control system and said ABS braking system are configured and interact in such a manner that said retarder control system is apprised when said ABS braking system is active and modulating braking effort of said friction brakes;

(c) said step of the retarder control system effecting an operational state of on of said drivetrain retarder at a resistance level proportional to said displacement of said brake control member from its home position is triggered by displacement of said brake control member from its home position only when said vehicle is in motion and said braking ABS system of said vehicle is not active.

27. The vehicle of claim 26, wherein:

(a) said drivetrain retarder is an engine compression brake.

28. The vehicle of claim 27, wherein:
(a) said retarder control system comprises a microcomputer; and
(b) said retarder control system further comprises a computer program embodied in computer readable medium, which computer program causes said retarder control system to perform said steps of said brake triggered method.

29. The vehicle of claim 28, wherein:
(a) said microcomputer of said retarder control system is communicatively linked to sensors and switches of systems of said vehicle other than said retarder control system and controls at least parts of operation of said other system of said vehicle in addition to controlling at least parts of said operation of said retarder control system.

30. The vehicle of claim 25, wherein:
(a) said drivetrain retarder is an engine compression brake.

31. A vehicle, comprising:
(a) one or more frame structures to which a majority of other components of said vehicle are engaged directly or indirectly and from which a majority of other components of said vehicle derive support directly or indirectly;
(b) a suspension system to which said one or more frame structures of said vehicle are engaged and which supports said one or more frame structures in an elevated position above the around and which provides said vehicle with relatively low resistance to movement alone the ground;
(c) an occupant cabin which is engaged to and supported by said one or more frame structures of said vehicle;
(d) a drivetrain which is engaged to said one or more frame structures of said vehicle and which is operable to provide motivation of said vehicle along the ground;
(e) a drivetrain retarder engaged to one or more of said frame structures of said vehicle and some part of said drivetrain of said vehicle, which drivetrain retarder is operable to resist movement of said vehicle alone the ground;
(f) a retarder control system that controls whether said drivetrain retarder has an on operational state, in which it resists movement of said vehicle along the ground, or an off operational state, in which it presents little or no resistance to movement of said vehicle along the ground, and which drivetrain retarder controls a resistance level at which said drivetrain retarder is operated when it has an operational state of on;
(g) wherein said retarder control system is configured in such a manner that at least a portion of operation of said retarder control system comprises the steps of:
said retarder control system controlling said resistance level and said operational state at which said drivetrain retarder is operated based at least partially upon one or more factors selected from a group consisting of speeds of one or more drivetrain components, vehicle speed, rotational speed of one or more undriven wheels, position of a brake control member, elapsed time of activation of a brake control member and elapsed time that said drivetrain retarder has had an on operational state;
(h) in addition to said drivetrain retarder, said vehicle comprises friction brakes;
(i) said vehicle further comprises a brake control member that causes actuation of said friction brakes when said brake control member is displaced from its home position to a brake trigger position;
(j) said vehicle comprises a switch or sensor, to which said retarder control system is communicatively linked, and which provides signals to said retarder control system that are dependent upon whether or not said brake control member is disposed in its home position or displaced from its home position to a brake trigger position;
(k) said retarder control system is configured in such a manner that at least part of operations of said retarder control system are executed in accordance with a brake triggered activation method which comprises the steps of:
when said vehicle is in motion and said brake control member is displaced from its home position and is in a brake trigger position, said retarder control system effecting an on operational state of said drivetrain retarder of said vehicle;
(l) said friction brakes of said vehicle comprises an ABS braking system for modulating braking effort of said friction brakes to prevent wheel slip of wheels of said suspension system of said vehicle;
(m) said retarder control system and said ABS braking system are configured and interact in such a manner that said retarder control system is apprised when said ABS braking system is active and modulating braking effort of said friction brakes;
(n) said step of the retarder control system effecting an operational state of on of said drivetrain retarder is triggered by displacement of said brake control member from its home position only when said vehicle is in motion and said braking ABS system of said vehicle is not active.

* * * * *